United States Patent [19]

Solomon et al.

[11] Patent Number: 4,581,429
[45] Date of Patent: Apr. 8, 1986

[54] POLYMERIZATION PROCESS AND POLYMERS PRODUCED THEREBY

[75] Inventors: David H. Solomon, Glen Waverley; Ezio Rizzardo, Wheelers Hill; Paul Cacioli, Reservoir, all of Australia

[73] Assignee: Commonwealth Scientific and Industrial Research Organization, Australia

[21] Appl. No.: 629,929

[22] Filed: Jul. 11, 1984

[30] Foreign Application Priority Data

Jul. 11, 1983 [AU] Australia .......................... PG0223
Jul. 11, 1983 [AU] Australia .......................... PG0224
Jul. 11, 1983 [AU] Australia .......................... PG0225
Feb. 10, 1984 [AU] Australia .......................... PG3578

[51] Int. Cl.$^4$ ................................ C08F 4/32
[52] U.S. Cl. ................... 526/220; 546/112; 546/141; 546/184; 564/300; 564/301; 548/542
[58] Field of Search .................. 564/300, 301; 260/465.5 R; 548/469, 452, 542; 546/184; 526/220

[56] References Cited

U.S. PATENT DOCUMENTS 3,372,182  3/1968  Hoffmann ......................... 564/301
3,869,278  3/1975  Wilcox ............................ 564/301

Primary Examiner—Paul R. Michl
Attorney, Agent, or Firm—Sughrue, Mion, Zinn, Macpeak and Seas

[57] ABSTRACT

The present invention relates generally to improved processes for free radical polymerization, particularly to improved processes in which it is possible to control the growth steps of the polymerization to produce relatively short chain length homopolymers and copolymers, including block and graft copolymers, and further relates to new initiators which find particular application in the improved processes. Such initiators have the general structure of Formula I

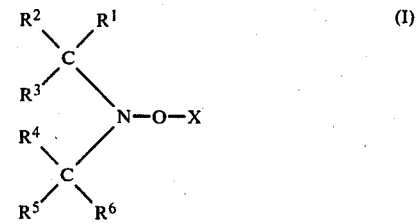

wherein
X represents a group having at least one carbon atom and is such that the free radical X· is capable of polymerizing the unsaturated monomer by free radical polymerization, and the radical functionality resides on the or one of the carbon atoms,
$R^1$, $R^2$, $R^5$ and $R^6$ represent the same or different straight chain or branched substituted or unsubstituted alkyl groups of a chain length sufficient to provide steric hindrance and weakening of the O—X bond, and
$R^3$ and $R^4$ represent the same or different straight chain or branched substituted alkyl groups or $R^3CNCR^4$ may be part of a cyclic structure which may have fused with it another saturated or aromatic ring, the cyclic structure or aromatic ring being optionally substituted.

19 Claims, 16 Drawing Figures

Scheme 1

Scheme 2

Scheme 3

Scheme 4

7

8

9

10

11

12

13

14

15

16

17

18

19

20

21

22

23

24

25

26

27

28

29

30

31

32

33

34

35

39

40, R = H
41, R = CH₃

42, $R^1 = CH_3$, $R^2 = H$, $R^3 = Ph$

43, $R^1 = CH_3$, $R^2 = CH_3$, $R^3 = CO_2CH_3$

44, $R^1 = CH_3$, $R^2 = H$, $R^3 = CO_2CH_3$

45, $R^1 = H$, $R^2 = H$, $R^3 = Ph$

46

POLYMERIZATION PROCESS AND POLYMERS PRODUCED THEREBY

The present invention relates generally to improved processes for free radical polymerization, particularly to improved processes in which it is possible to control the growth steps of the polymerization to produce relatively short chain length homopolymers and copolymers, including block and graft copolymers, and further relates to new initiators which find particular application in the improved processes.

Polymers having relatively low molecular weight (short chain lengths), which are often referred to as oligomers, have recently become of increasing interest since such polymers have been found to be useful in a variety of products, such as for example, in the production of surface coatings, such as high solids or solvent-free surface coatings, in adhesives, as plasticizers in polymeric compositions, and as reactive intermediates for the production of a wide variety of other materials such as for example surface active agents. While various alkyds, polyesters, polyethers, polyamides and polyurethanes having molecular weights in the range 500 to 2500 can be conveniently prepared in general by step growth polymerization, it has not been possible to produce similarly sized polymers satisfactorily by free radical polymerization. Indeed British Pat. No. 1,431,446 to Rohm and Haas Corporation of USA teaches that:

"Attempts have been made to prepare acrylic polymers having molecular weight distributions in the range of 500 to 5000 by free radical polymerization techniques. However these procedures have generally been unsatisfactory either because of the high temperatures or high pressures needed to carry out the polymerization reaction or because of chain transfer agents employed in the reaction have objectionable odours or toxicity or because the properties of the polymer produced in the polymerization reaction have been adversely affected by a high incidence of initiator or chain transfer fragments on the polymer chains.

Furthermore, it is difficult to control the molecular weight distribution of polymers prepared by free radical techniques. Thus such polymers tend to have a broad molecular weight distribution, and tend to contain significant amounts of high and very low molecular weight polymer, which can give unattractive properties to the polymer compositions."

As stated above the preparation of some oligomers from unsaturated monomers has been limited by the technology available for free radical polymerization and until the discovery of the present invention it was difficult to obtain polymers with chain lengths below 200 monomer units by free radical polymerization.

Although techniques such as anionic or cationic polymerization in some circumstances can produce satisfactory oligomers from unsaturated monomers, the stringent reaction conditions required by these techniques are difficult to attain on an industrial scale, and in addition many monomers cannot be polymerized by these techniques.

Anionic, cationic and step-growth polymerizations are much more amenable to controlled growth since the reactions proceed one step at a time and can be stopped after a few steps if desired. Therefore, it would be desirable if the control achieved by step-growth polymerization techniques could also be achieved by free radical polymerization, but without the disadvantages of the stringent reaction conditions.

In the past the synthesis of block copolymers has been practically possible only by anionic polymerization although they could for a very limited number of monomers be made using cationic polymerization. The use of sequential addition of monomers in a conventional free radical polymerization leads to a mixture of homopolymers since there would be no living radicals at the end of each monomer addition step and new radicals would need to be produced to start the new monomer polymerizing. There are other methods known as transformation reactions that have been used to produce block copolymers of the AAAABBBB type. One of these is anionic polymerization of one monomer followed by reaction with bromine to give a bromo terminated polymer which is in turn reacted with silver perchlorate in the presence of the second monomer. This method is cumbersome and of limited applicability. Another method is anionic polymerization of one monomer followed by conversion of the anionic centre to a free radical by reaction with trimethyl lead chloride and heating this produces a block copolymer contaminated with homopolymer of the second monomer. Other transformation reactions are radical polymerization followed by cationic polymerization, or radical polymerization followed by anionic polymerization. All these methods suffer from the disadvantages mentioned above.

A further development of block copolymers are graft copolymers which are polymeric materials consisting of a backbone polymer chain to which are attached a plurality of polymer chains, with the attached or grafted polymer being chemically different from the backbone polymer chain. By way of illustration a graft copolymer of two monomers A and B could have the following chemical structure:

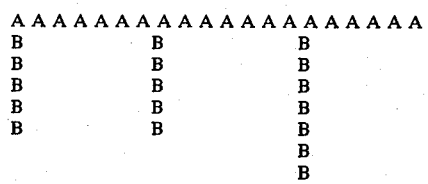

Each of the backbones and grafted chains themselves may be copolymers of different monomers such as for example block copolymers. In addition either backbone or grafted chains may be branched.

Because of their structure graft copolymers have unique properties, in particular the chemical coupling of unlike polymeric entities makes graft copolymers useful for their surface active properties particularly in stabilizing physical blends of other wise incompatible polymers or monomeric compounds. They are of considerable industrial interest.

The usual method of formation of graft polymers involves first forming the polymer backbone or utilizing a naturally occurring polymer as a backbone and then creating an active polymerization initiating site at various places on the backbone polymer and utilizing this site to polymerize the necessary monomer(s) to form the graft chain. To form the graft chain the addition polymerization of vinyl monomers by free radical or cationic means, step growth polymerization, or ring opening polymerization of cyclic monomers may be utilized.

A common method of producing graft copolymers be free radical polymerization of the grafted chain is by generating radical sites on the polymer backbone in the presence of the monomer to be grafted. The radical sites can be generated by hydrogen atom abstraction from the polymers by a free radical, by irradiating with ultraviolet or ionizing radication or by use of a redox system, e.g. $Fe^{++}/H_2O_2$, when the backbone polymer contains suitable functional groups, e.g. hydroxyl. This general procedure usually gives rise to homopolymer as well as the desired graft copolymer. Using this method it is difficult to control the length of the grafted chains since the chains once initiated grow very rapidly until terminated by reaction with another radical.

An alternative method of the prior art is to produce reactive monomeric units into a polymer chain by copolymerization methods or by chemically treating the backbone polymer. Acrylic polymers and copolymers, for example, may be treated with phosphorus pentachloride and then reacted with a hydroperoxide to form a perester. The latter, upon decomposition, gives free-radical sites for grafting.

The direct peroxidation of the backbone polymer with peroxides and hydroperoxides can sometimes be employed, but attempts to introduce active groups directly into polystyrene by reacting with benzoyl peroxide have not been successful. If a comonomer containing isopropyl groups is introduced into the polystyrene chain, direct peroxidation can be achieved.

It has been discovered that it is now possible to produce oligomeric and normal short chain length homo- or co-polymers by means of controlled-growth free radical polymerization by processes in accordance with the present invention and by processes initiated by compounds in accordance with the present invention.

According to one aspect of the present invention there is provided an initiator suitable for use in processes for the production of polymers, particularly oligomers, by free radical polymerization of a suitable unsaturated monomer, said initiator having the general structure of Formula I

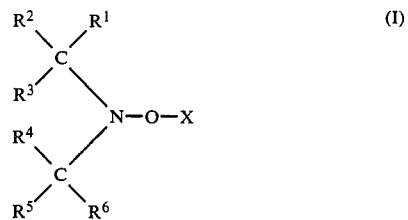

wherein

X is a group comprising at least one carbon atom and is such that the free radical X· is capable of polymerizing the unsaturated monomer by conventional free radical polymerization, and the radical functionality resides on the or one of the carbon atoms, and the groups $R^1$, $R^2$, $R^5$ and $R^6$ are the same or different straight chain or branched substituted or unsubstituted alkyl groups of a chain length sufficient to provide steric hindrance and weakening of the O—X bond, and $R^3$ and $R^4$ are the same or different straight chain or branched alkyl or substituted alkyl groups or $R^3CNCR^4$ may be part of a cyclic structure which may have fused with it another saturated or aromatic ring.

According to a further aspect of the present invention there is provided a method for the production of a polymer or a copolymer, particularly an oligomer, by free radical polymerization of a suitable unsaturated monomer, comprising heating a compound having the general structure of Formula I with the appropriate monomer.

Another aspect of the present invention is directed to polymers, particularly short chain oligomers, prepared by the processes of the present invention.

According to a further aspect of the present invention there is provided a block copolymer made by the polymerization process of the present invention by alternately adding two or more monomers in order to produce a polymer with sequences of each monomer joined together. Another aspect of the present invention is directed to the production of graft copolymers by the processes of the present invention and to graft copolymers so produced.

Preferably, weakening of the O—X bond is achieved at moderate temperatures.

Suitable groups for X are tertiary butyl, cyanoisopropyl, phenyl, methyl or the like. In general the structure of X will be of the form $$\begin{array}{c} R \\ | \\ C-R' \\ | \\ R'' \end{array}$$

wherein R, R' and R", are the same or different and may be selected from hydrogen, alkyl, phenyl, cyano, carboxylic acid, or carbocylic groups including substituted groups thereof.

Suitable groups for $R^1$, $R^2$, $R^5$ and $R^6$ are methyl, ethyl, propyl, butyl, isopropyl, isobutyl, t-butyl, neopentyl, benzyl or the like.

Suitable groups for $R^3$ and/or $R^4$ are methyl, ethyl, propyl, butyl, iospropyl, isobutyl, t-butyl, pentyl, octadecyl or the like, of if $R^3CNCR^4$ is part of a cyclic structure this cyclic structure may be

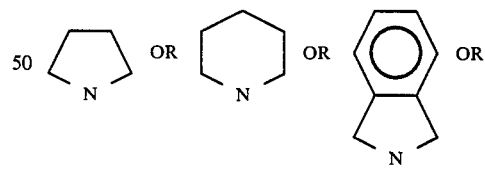

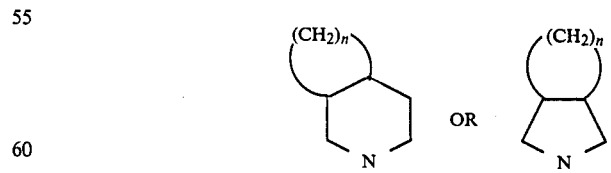

The cyclic structure may be substituted.

For controlled free radical polymerization by the initiators of Formula I it is desirable that the nitroxide radical of Formula II does not initiate any substantial free radical polymerization of the unsaturated monomers itself.

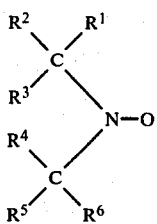

While alkoxy amines of which the compounds of formula I form a sub-group, are well known compounds, the compounds in accordance with Formula I are considered to be novel by virtue of the nature of their substituents.

It has been discovered that hindered alkoxy amines generally in accordance with the present invention can be used as initiators of free radical polymerization at convenient temperatures. Further, it has been discovered that such polymerization processes proceed by insertion of monomer units between the nitroxide radical of Formula II and X·

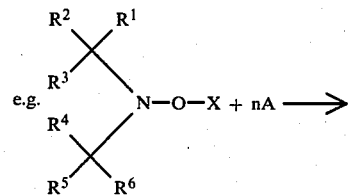

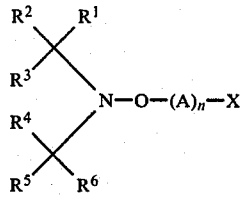

by a reversible termination process. This process is called controlled-growth free radical polymerization in the present specification.

Alkoxy amines such as those of Formula I can be manufactured by heating a nitroxide radical of Formula II in the presence of a stoichiometric amount of a carbon centred free radical X·, where X· may be generated by any of the methods well known in the art e.g. by the decomposition of an azo compound, by cission of an alkoxy radical or by H atom abstraction from a suitable monomeric or polymeric compound or by addition of a free radical to an olefin. More specifically X· can be generated by the thermal or photochemical dissociation of X—X, or X—Z—X or X—Z—Z—X where Z is a group which in its uncombined form is a small stable molecule e.g. $CO_2$ or $NH_2$.

The alkoxyamine so formed may be isolated and purified for later use or it may be used without further purification for the initiation of polymerization.

The nitroxides of Formula II may be readily prepared by the oxidation of the appropriate secondary amine or hydroxylamine, reduction of the appropriate nitro or nitroso compound, or by the addition of free radicals to nitrones. Alternatively the alkoxyamine initiators can either by prepared or generated in situ by the addition of a source of free radicals to a suitable nitroxide either in the presence of an unsaturated monomer or with the monomer being added after the free radicals have reacted with the nitroxide. The free radicals can be generated by any of the methods well known in the art, e.g. by the decomposition of an azo compound, by cission of an alkoxy radical or by H atom abstraction from a suitable monomeric or polymeric compound, or by addition of a free radical to an olefin.

Preferably in the method of the present invention, the heating of the compounds of Formula I and the monomer is performed in a non polymerizable medium such as for example benzene, toluene, ethyl acetate.

The method of this aspect of the present invention is particularly suitable for the production of oligomeric polymers and copolymers including block and graft copolymers, and of course includes the reaction of two or more different monomers.

It is thus possible to control the polymerization processes of the present invention by selecting alkoxyamines of Formula I with appropriate substituents, selecting the polymerization temperature, and the amount and type of monomer(s) added at any one time. Additional nitroxide radical of Formula II may be added if desired, such as for example to stabilize growing polymer chain. Although this controlled growth radical polymerization will proceed until the monomer present is consumed and then stop, the polymeric free radical is in effect "living" and polymerization will continue if further amounts of a polymerizable monomer are added. This additional monomer may not necessarily be the same as the previous monomer hence this controlled growth free radical polymerization has some advantages such as for example the flexibility and ability to produce polymers of controlled chain length and to produce block and graft copolymers. Further, the present method is applicable to a wide range of monomers. Additionally, it is now possible to readily prepared short chain oligomeric polymers from unsaturated monomers because the polymer chain length in any one polymerization step can be controlled by the relative amounts of monomer and initiator present in the reaction.

In one form of the polymers prepared by the processes of the present invention the polymers are oligomers which have functional groups capable of undergoing further chemical reactions to form useful materials. The polymers produced by the methods of the present invention will have a terminal oxyamine group such as that shown as Formula II on one end of the chain and an initiator residue (X) on the other end and depending upon the monomers used may have chemically reactive functional groups along the chain. Thus the products of this method will have at least one functional group per molecule. For technical, economic or other reasons it may be necessary or desirable to remove the oxyamine end group; which may be accomplished in ways that give a stable functional group at the end of the polymer chain. For example, reduction by well known methods e.g. $Zn/CH_3COOH$ gives a hydroxy terminated polymer and a free amine which can be reoxidised to the nitroxide. The oxyamine terminated polymer may be reacted with hydrogen donors, e.g. thiols to give a hydrogen terminated polymer and hydroxylamine which can be re-oxidised to the nitroxide, and with another free radical to give a range of terminal groups. If the last monomer unit is methyl methacrylate the oxyamine can decompose to form the unsaturated terminal group

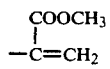

and a hydroxylamine; these oligomeric polymers with terminal unsaturation have been named macromers. Macromers are capable of further polymerization or copolymerization via the unsaturated group to give a polymer with pendent chains.

The alkoxyamines may have other functional groups which can be used for further reactions of the oligomers if the Nitroxide end group can be kept as part of the polymer molecule. Alternatively the group X derived from the initial free radical initiator may contain functional groups.

A mixture of monomers can be added in the polymerization step to produce a random copolymer similar to that produced by normal free radical polymerization except with controlled chain length.

In contrast to the problems associated with prior art processes for producing block copolymers the method of the present invention produces block copolymers clearly with as many changes of monomer as desired and offers the possibility of producing block copolymers with short sequences of monomers. These would be a new class of materials with properties different from any other copolymer of the monomers concerned.

If necessary the block copolymers can be provided with reactive functional groups as described above.

In one embodiment of the processes of the present invention there is provided a two stage method for preparing a graft copolymer comprising firstly forming in a first stage reaction a polymer with pendent alkoxyamine groups of the general structure of Formula I, and adding further monomer to the product of the first stage reaction to form a graft copolymer by controlled growth free radical polymerization. The graft copolymer may be isolated in the ways well known in the art. It should be noted that this method gives graft copolymer substantially free from any homopolymer. One method of making a polymer with alkoxyamine groups is by creating free radical sites on a preformed polymer in the presence of a nitroxide. This may be achieved by the methods described above or by reacting the polymer with a free radical which is capable of abstracting a hydrogen atom from the polymer in the presence of the nitroxide. Preferred free radicals for this are oxygen centered radicals such as hydroxy, t-butoxy and benzoyloxy. Optionally the product of this reaction may be isolated, for analysis and storage, or the next stage of the reaction may be carried out without isolation. In another embodiment of the processes of the present invention there is provided a method of making a polymer with alkoxyamine groups comprising copolymerizing two or more monomers wherein at least one of the monomers contains an alkoxyamine group so as to be capable of forming the polymer containing alkoxyamine groups of the general structure of Formula I.

The alkoxyamine can be any of those specified in Formula I. The grafted chains can be formed by any of the polymerization processes described herein and may themselves by homopolymers, random copolymers or block copolymers.

To assist in understanding this aspect of the invention the chemistry of the graft polymerization process of the present invention is illustrated in FIG. 1.

Figure 1:
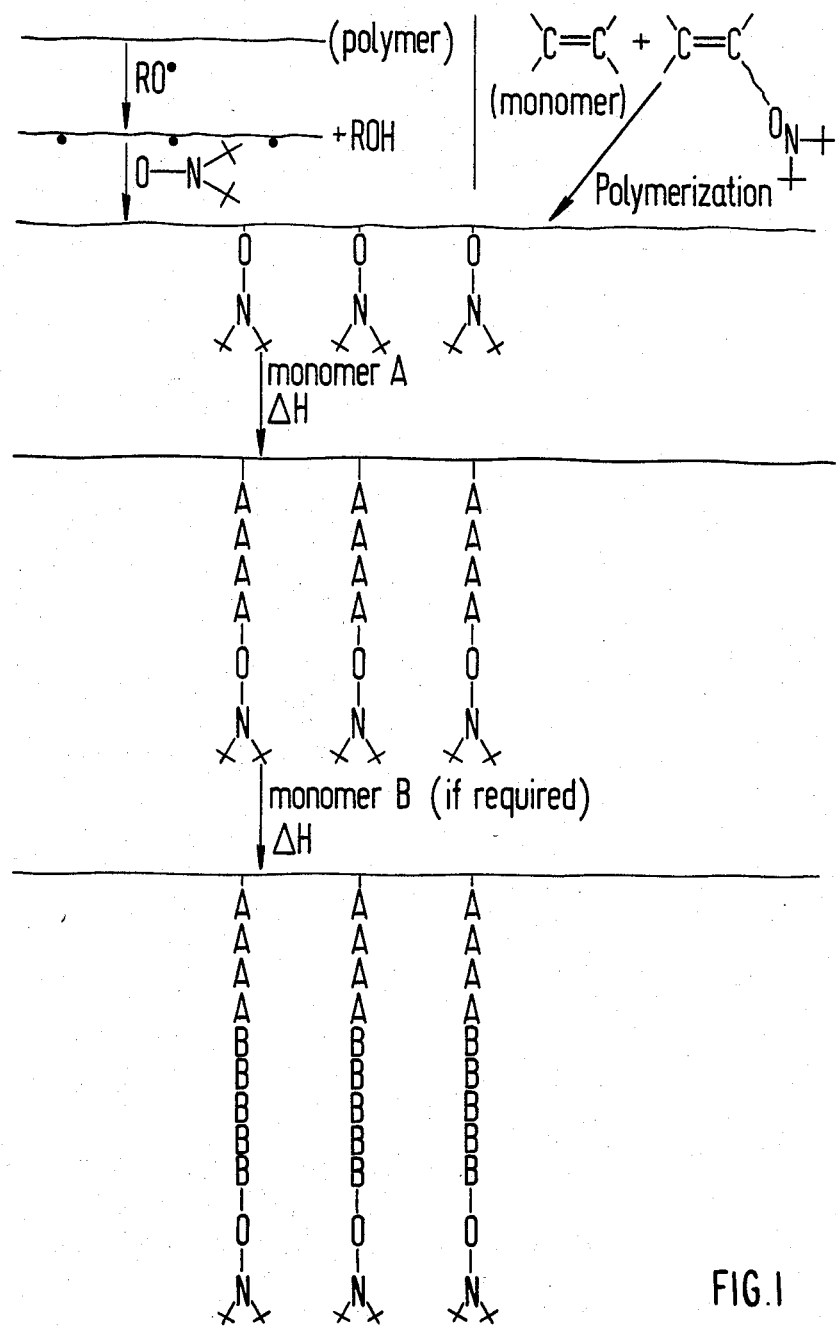
Figure 2A:
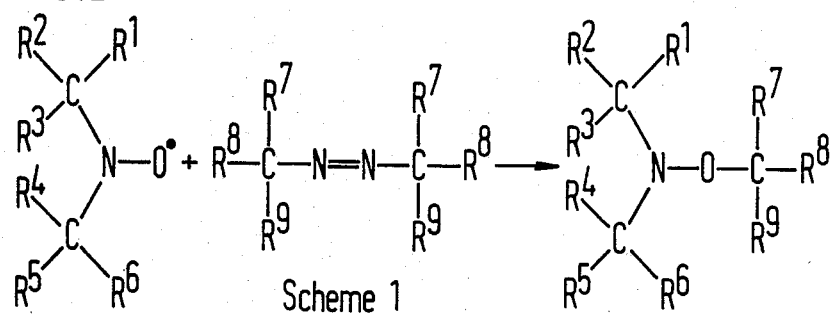
FIGS. 2A–2D illustrate four reaction schemes according to the present invention.
Figure 2B:
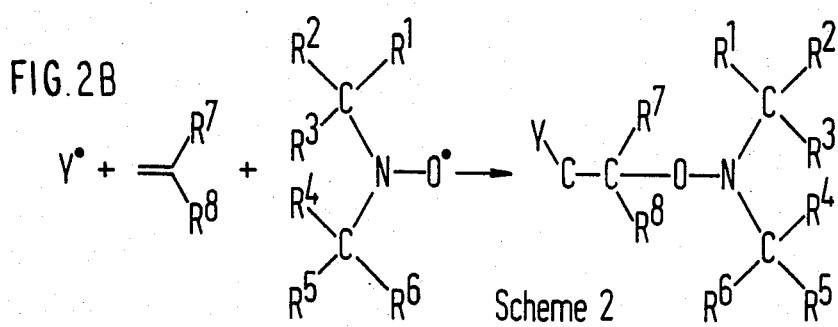
Figure 2C:
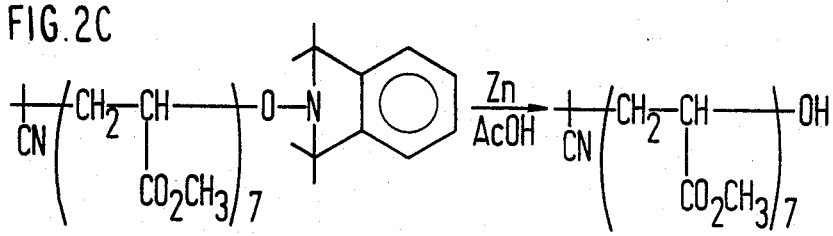
Figure 2D:
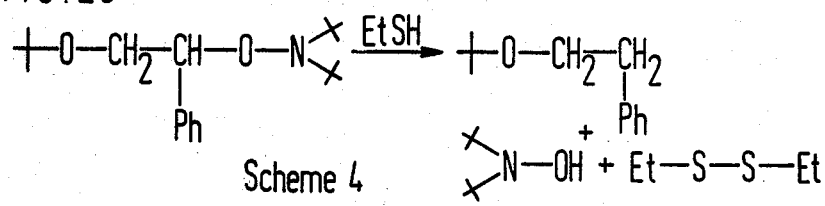
Figure 3A:
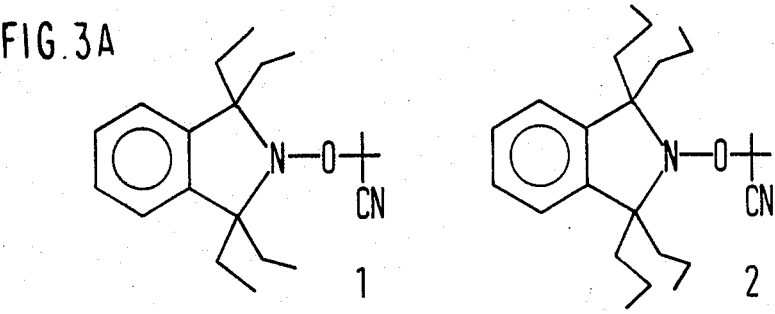
FIGS. 3A–3K illustrate compounds 1–46 referred to herein.
Figure 3A:
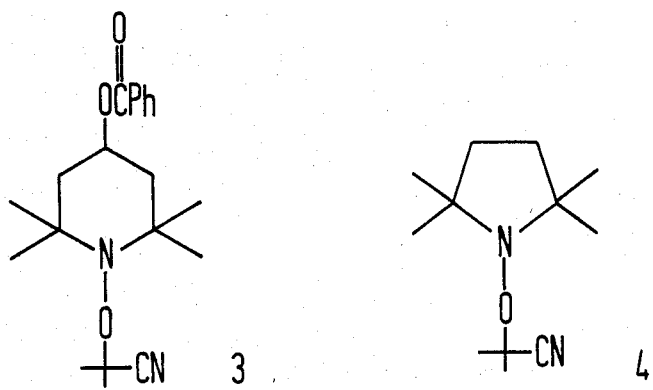
Figure 3A:
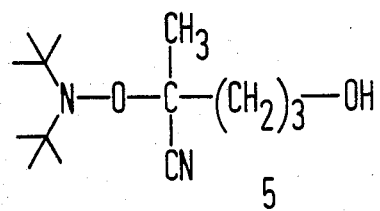
Figure 3A:
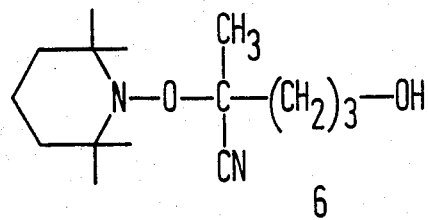
Figure 3B:
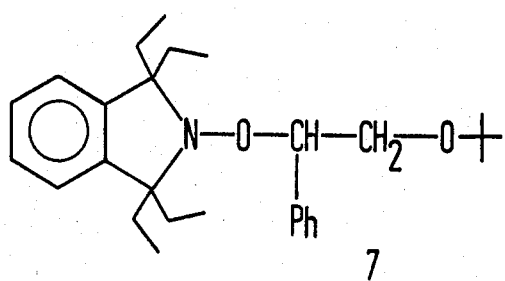
Figure 3B:
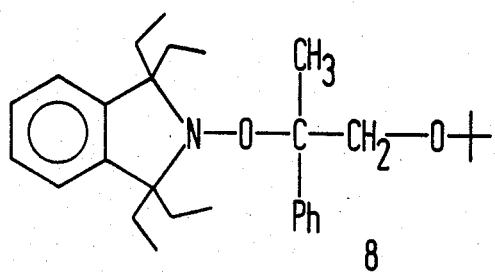
Figure 3B:
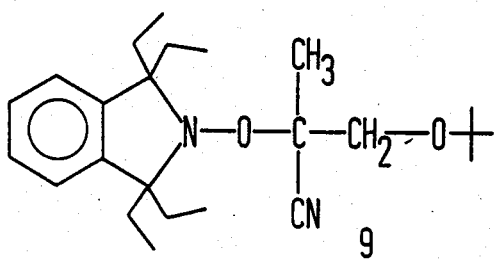
Figure 3B:
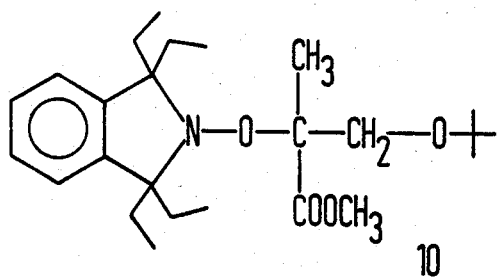
Figure 3C:
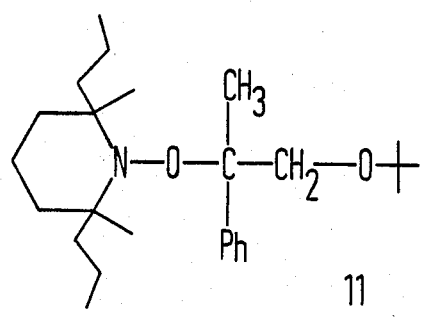
Figure 3C:
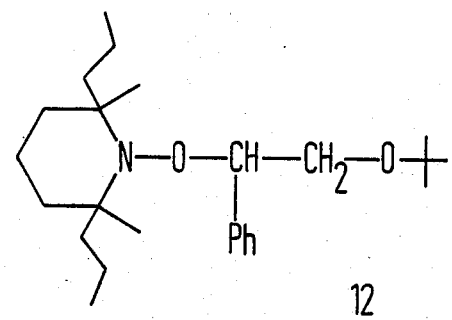
Figure 3C:
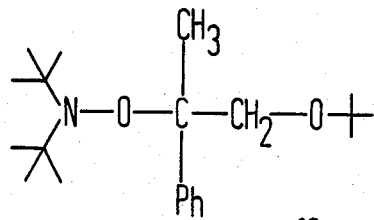
Figure 3C:
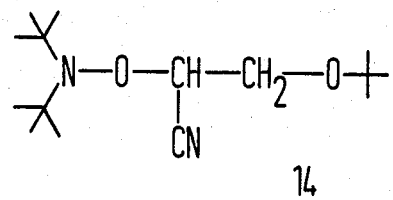
Figure 3D:
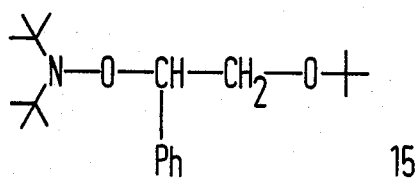
Figure 3D:
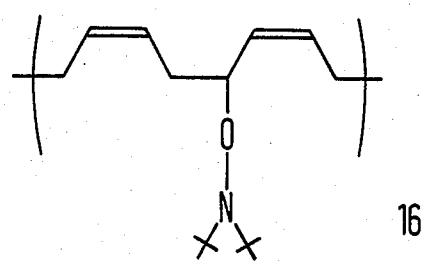
Figure 3D:
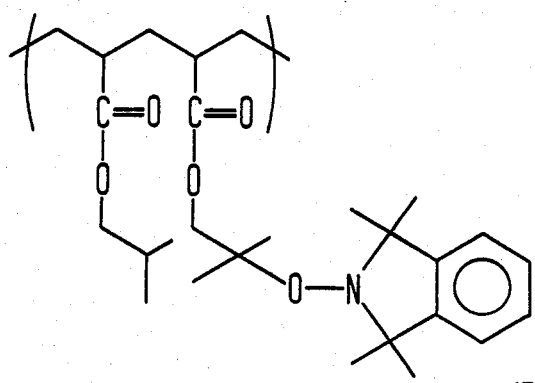
Figure 3D:
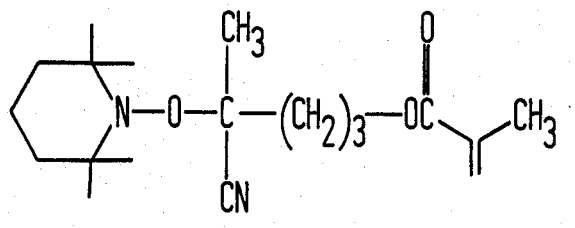
Figure 3E:
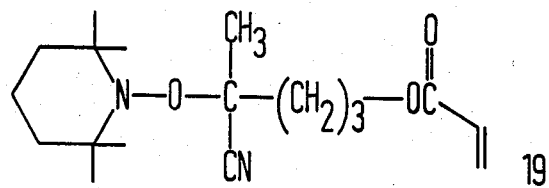
Figure 3E:
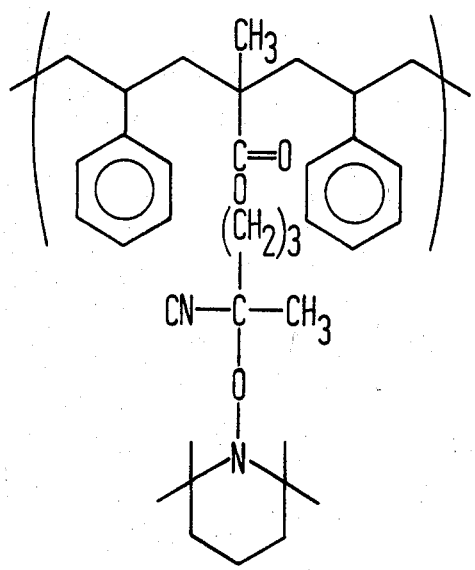
Figure 3E:
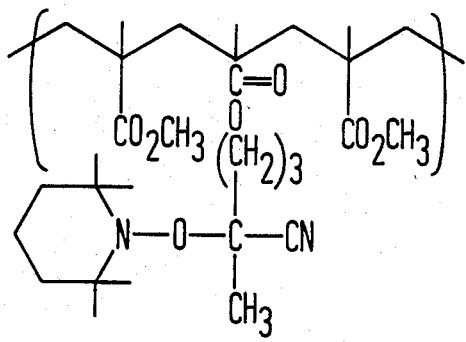
Figure 3F:
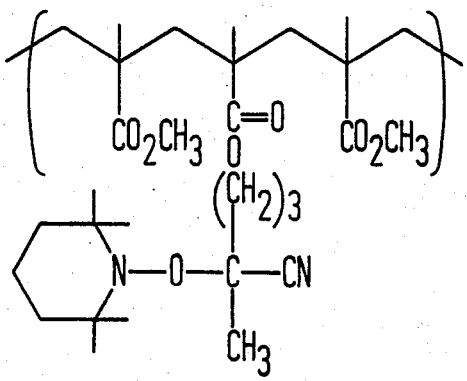
Figure 3F:
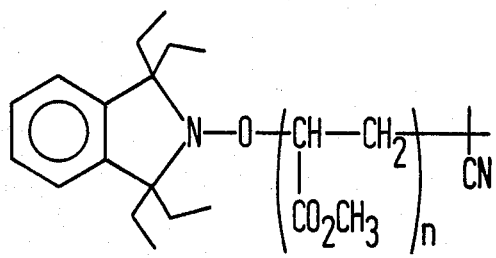
Figure 3F:
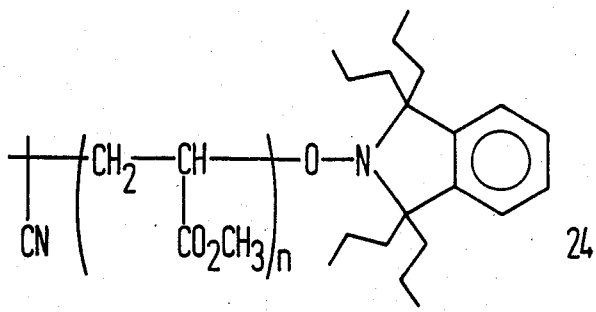
Figure 3F:
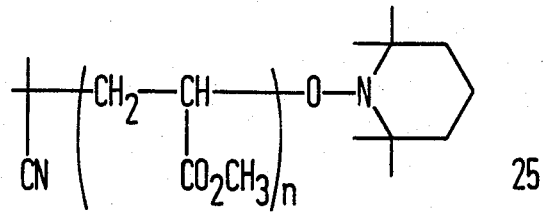
Figure 3G:
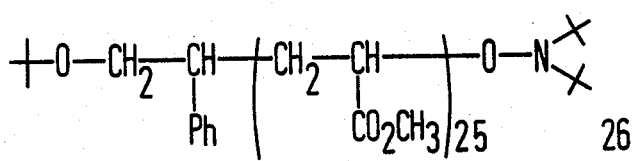
Figure 3G:
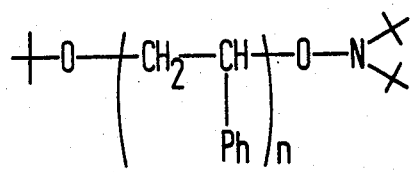
Figure 3G:
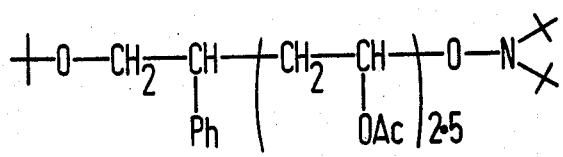
Figure 3G:
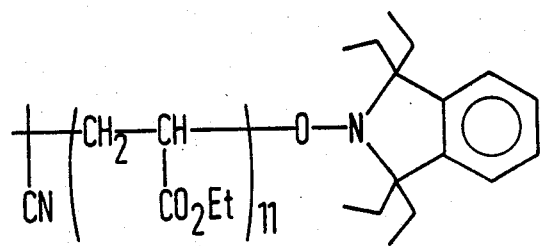
Figure 3G:
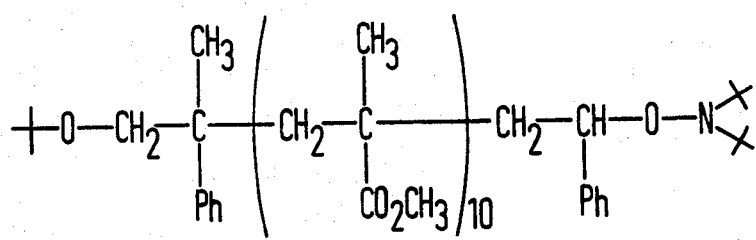
Figure 3H:
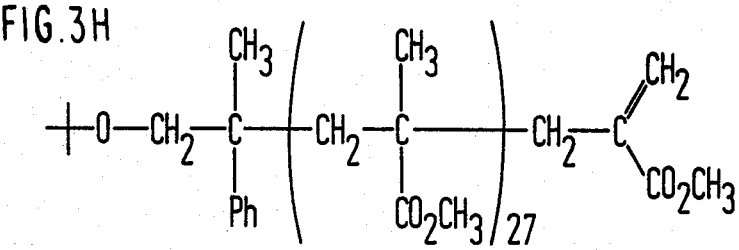
Figure 3H:
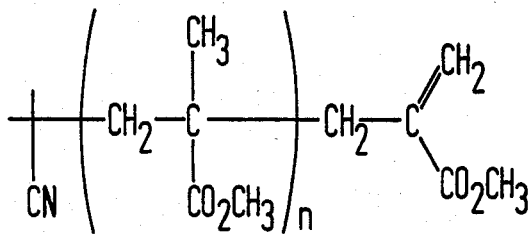
Figure 3H:
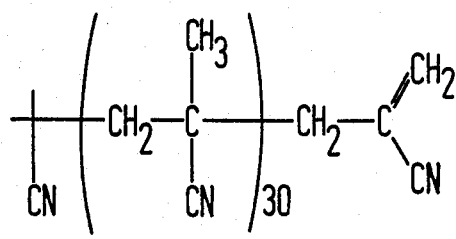
Figure 3H:
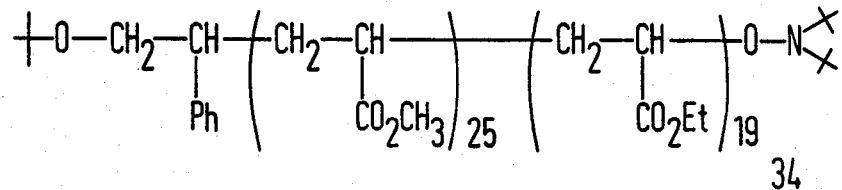
Figure 3H:
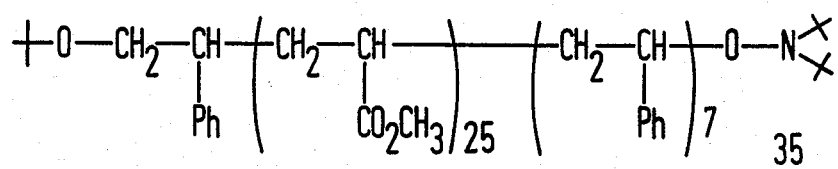
Figure 3I:
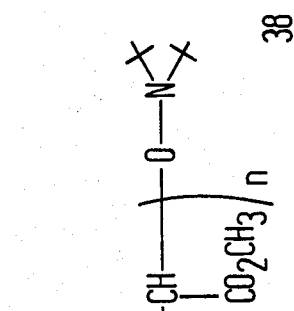
Figure 3I:
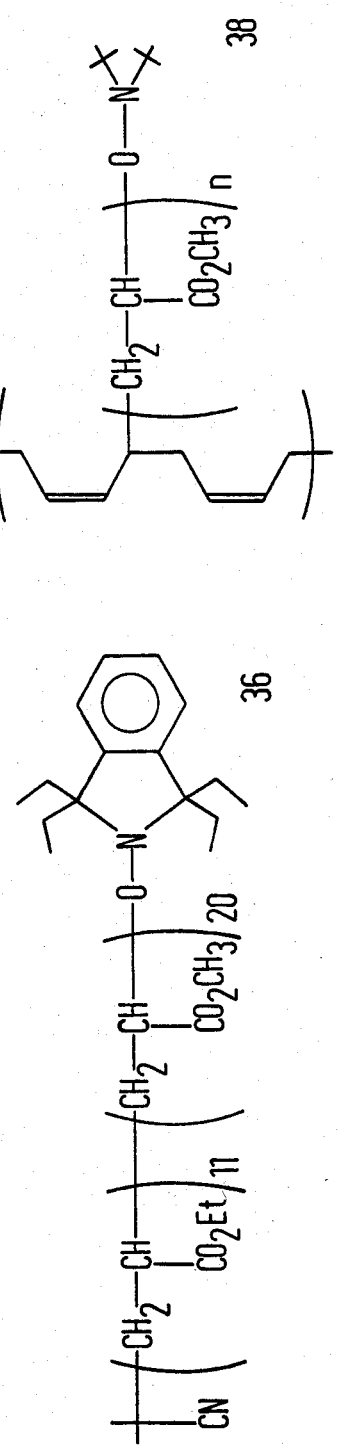
Figure 3I:
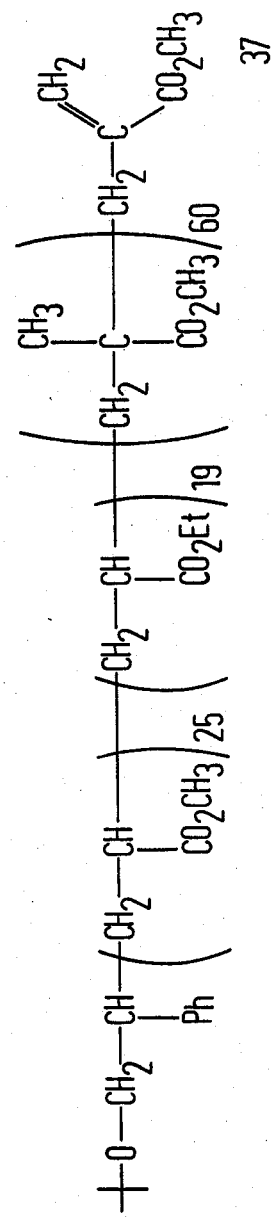
Figure 3J:
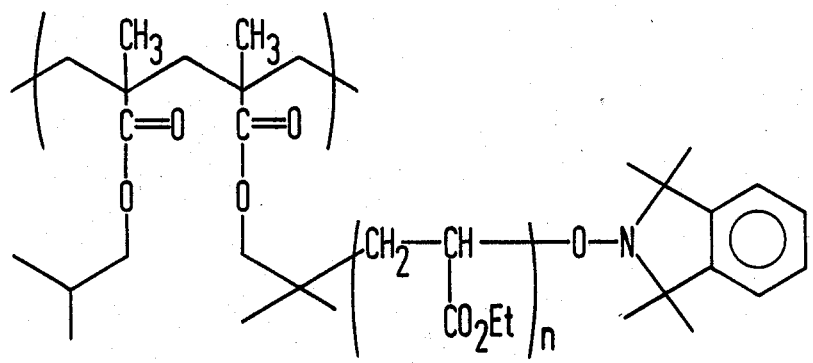
Figure 3J:
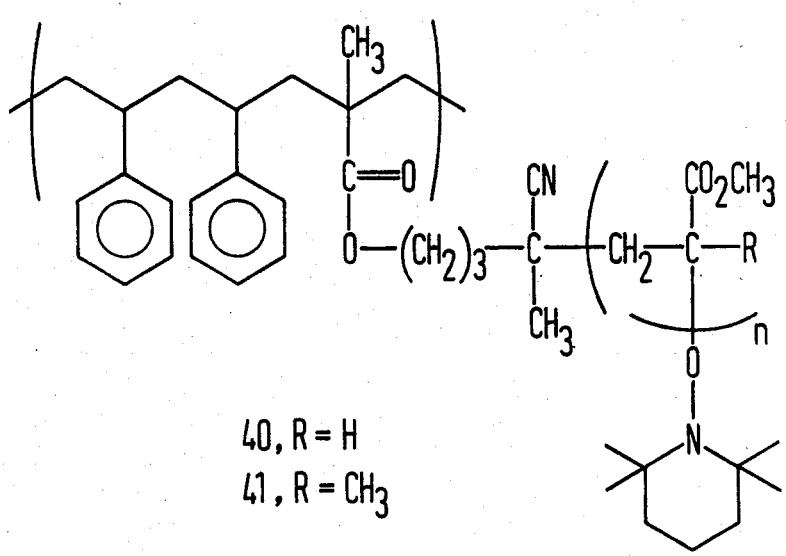
Figure 3K:
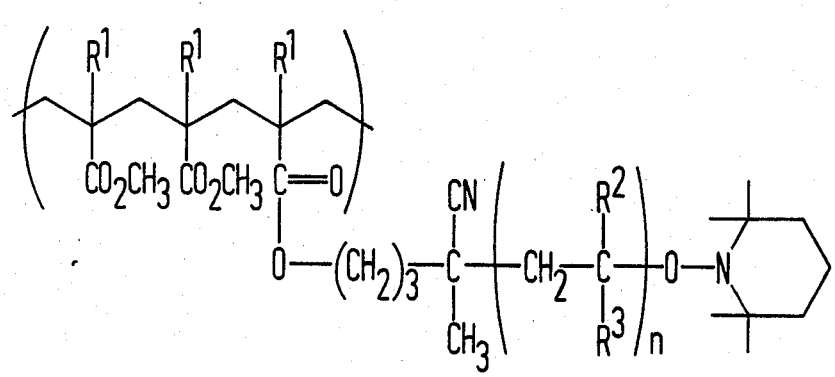
Figure 3K:
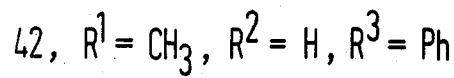
Figure 3K:
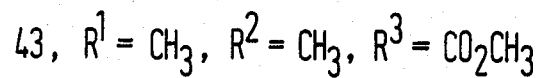
Figure 3K:
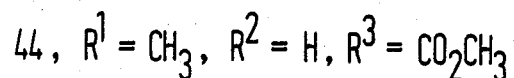
Figure 3K:
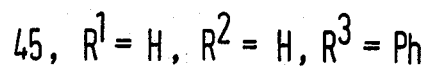
Figure 3K:
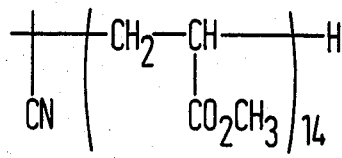

The invention will now be illustrated by the following non limiting examples:

The preparation of alkoxyamines and of polymers were carried out on degassed solutions in evacuated and sealed vessels. Degassing was performed by 3 successive freeze/thaw cycles at $10^{-3}$ torr. $^1H$ NMR spectra were recorded on a Varian EM390 or a Bruker WM250 spectrometer with deuterochloroform as solvent (unless otherwise stated) and tetramethylsilane as internal standard. HPLC was performed on a Du Pont 850 liquid chromatograph using Ultrasphere ODS or Zorbax ODS columns. GPC measurements were carried out on a Waters system using 5 microstyrogel columns with exclusion limits of $500-10^6$ Angstroms. Tetrahydrofuran was used as the eluent at a flow rate of 1.02 ml/min and the system was calibrated with polystyrene standards. Monomers and solvents were purified by standard techniques immediately before use.

The half-life of the alkoxyamines refers to the value obtained in dilute ethyl acetate solution (unless otherwise specified) and in the presence of a 10–20 fold excess of a nitroxide to scavenge the carbon-centered radicals (X·) from the dissociation of the alkoxyamine. The nitroxide chosen as the scavenger was, of course, different from the one arising from the dissociation of the alkoxyamine under investigation. The disappearance of the alkoxyamine was followed by HPLC and an internal standard was used in each case.

Preparation of Nitroxides 1,1,3,3-Tetraethylisoindolin-2-yloxyl (m.p. 54.5°–55.5° C.) was prepared following the published procedure for the synthesis of 1,1,3,3-tetramethylisoindolin-2-yloxyl. (Griffiths, Moad, Rizzardo and Solomon, Aust. J. Chem. 36, 397,(1983). Thus, N-benzylphthalimide was converted to 2-benzyl-1,1,3,3-tetraethylisoindoline by reaction with excess ethyl Grignard, the benzyl group was removed by hydrogenolysis with Pd/C and the resulting 1,1,3,3-tetraethylisoindoline was oxidized with hydrogen peroxide/sodium tungstate to the nitroxide.

1,1,3,3-Tetra-n-propylisoindolin-2-yloxy was prepared as a yellow-orange oil, in a similar manner, employing n-propyl Grignard reagent in place of ethyl Grignard.

2,6-Dimethyl-2,6-di-n-propylpiperidin-1-yloxyl was prepared from 2,6-dimethyl-1-hydroxypiperidine following the general strategy of reaction of Grignard reagents with nitrones, developed for the synthesis of substituted pyrrolidin-1-yloxyls (J. F. W. Keana, "New Aspects of Nitroxide Chemistry", in "Spin Labelling", L. J. Berlinder ed., Academic Press, New York, N.Y., Vol. 2, 1979). Thus, 2,6-dimethyl-1-hydroxypiperidine was oxidized with mercuric acid to give the nitrone. This was reacted with n-propylmagnesium iodide to give 2,6-dimethyl-1-hydroxy-2-propylpiperidine which was in turn oxidized with mercuric oxide and the product nitrone reacted with n-propylmagnesium iodide to give 2,6-dimethyl-2,6-dipropyl-1-hydroxypiperidine. This was oxidized with air in methanol containing a catalytic amount of cupric acetate to yield the nitroxide which was isolated as an orange oil by chromatography on silica gel.

Preparation of Alkoxyamines

A. By Decomposition of an Azo Compound in the Presence of a Nitroxide (Scheme 1).

EXAMPLE 1

Preparation of 2-(1-Cyano-1-methylethoxy)-1,1,3,3-tetraethylisoindoline (1)

A degassed solution of azobisisobutyronitrile (328 mg) and 1,1,3,3-tetraethylisoindolin-2-yloxyl (500 mg) in benzene (15 ml was heated at 70° C. for 16 hrs. The solution was chromatographed on silica gel and the desired product eluted with benzene. Crystallization from methanol/water gave 2-(1-cyano-1-methylethoxy)-1,1,3,3-tetraethylisoindoline (560 mg), m.p. 63°–64°; $^1$H NMR δ (CDCl$_3$): 0.75 (6H, t, J=7 Hz, 2×CH$_2$CH$_3$), 0.95 (6H, t, J=7 Hz, 2×CH$_2$CH$_3$), 1.75 (6H, s, OC(CH$_3$)$_2$CN), 1.9–2.25 (8H, m, 4×CCH$_2$CH$_3$), 6.95–7.35 (4H, m, ArH).

Half life at 60° in (solvent): 38 min (light petroleum), 33 min (ethyl acetate), 22 min (acetonitrile), 20 min (dimethylformamide), 17 min (methanol), 16 min (methanol:water, 9:1), 15 min (methanol:acetic acid, 9:1).

EXAMPLE 1

2-(1-Cyano-1-methylethoxy)-1,1,3,3-tetra-n-propylisoindoline (2)

A degassed solution of azobisisobutyronitrile (170 mg) and 1,1,3,3-tetra-n-propylisoindolin-2-yloxyl (400 mg) was heated at 60° C. for 40 hr. Chromatography on silica gel using light petroleum/benzene (1:1) as the eluent gave the title compound as a solid (320 mg), m.p. 110°–112° (dec) after recrystallization from light petroleum. $^1$H NMR δ (CDCl$_3$): 0.85 (12H, broad, t, 4×CH$_2$CH$_2$CH$_3$), 1.15–2.1 (16H, broad m, 4×CH$_2$CH$_2$CH$_3$), 1.7 (6H, s, OC(CH$_3$)$_2$CN), 6.95–7.35 (4H, m, ArH). Half life at 60° = 31 min.

EXAMPLE 3

Preparation of 1-(Cyano-1-methylethoxy)-4-benzoyloxy-2,2,6,6-tetramethylpiperidine (3)

A degassed solution of azobisisobutyronitrile (200 mg) and 4-benzoyloxy-2,2,6,6-tetramethylpiperidin-1-yloxyl (550 mg) in benzene (10 ml) was heated at ~72° C. for 16 hr. The solution was concentrated and the obtained solid was crystallized from methanol to yield (230 mg) white prisms m.p. 127.5°–129° C. $^1$H NMR δ (CDCl$_3$): 1.3 (12H, s, (CH$_3$)$_2$CNC(CH$_3$)$_2$), 1.75 (6H, s, OC(CH$_3$)$_2$CN), 2.05 (4H, m, CH$_2$CHOCH$_2$), 5.3 (1H, m, CH$_2$CHOCH$_2$) 7.5 (3H, m, ArH), 8.05 (2H, m, ArH). Half-life at 60° = 130 min.

EXAMPLE 4

Preparation of 1-(1-Cyano-1-methylethoxy)2,2,5,5-tetramethylpyrrolidine (4)

A degassed solution of azobisisobutyronitrile (200 mg) and 2,2,5,5-tetramethylpyrrolidin-1-yloxyl (300 mg) in benzene (10 ml) was heated at 67° C. for 18 hr. The product was isolated by column chromatography (using silica gel and petroleum ether: benzene (1:1) as eluent) as an oil (170 mg). $^1$H NMR δ (CDCl$_3$): 1.2 (6H, s, N—C(CH$_3$)$_2$), 1.3 (6H, s, NC(CH$_3$)$_2$), 1.65 (6H, s, OC(CH$_3$)$_2$CN), 1.7 (4H, s, CH$_2$CH$_2$). Half-life at 60° C.=280 mins.

EXAMPLE 5

Preparation of 4-Cyano-4-(di-t-butylaminyloxy)-pentanol (5)

A degassed solution of 4,4'-azobis(4-cyano-n-pentanol) (220 mg, 0.87 mmol) and di-t-butylnitroxide (250 mg, 1.74 mmol) in ethyl acetate (15 ml) was irradiated at 360 nm in a thermostated Rayonet apparatus at 20° C. for 24 hr. Chromatography on silica gel using light petroleum/ethyl acetate (3:7) as eluent gave the title compound as a colourless oil (190 mg). $^1$H NMR δ (CDCl$_3$): 1.2 (9H, s, C(CH$_3$)$_3$), 1.3 (9H, s, C(CH$_3$)$_3$), 1.65 (3H, s, CH$_3$), 1.9 (4H, m, CH$_2$CH$_2$), 3.7 (2H, broad t, OCH$_2$). Half-life at 40° C.=8.5 min.

EXAMPLE 6

Preparation of 1-(1-Cyano-4-hydroxy-1-methylbutoxy)-2,2,6,6-tetramethylpiperidine (6)

A degassed solution of 2,2,6,6-tetramethylpiperidin-1-yloxy (600 mg, 3.85 mmol) and 4,4'-azobis(4-cyano-n-pentanol) (500 mg, 1.98 mmol) in ethyl acetate (20 ml) was heated at 80° C. for 2 hr.

Chromatography on silica gel using light petroleum/ethyl acetate (1:1) as eluent gave the desired product as a colourless oil (150 mg 28% yield). $^1$H NMR δ (CDCl$_3$): 1.1 (9H, broad, s, 3×CH$_3$), 1.3 (4H, s, 2×CH$_2$), 1.5 (5H, s), 1.7 (3H, s, CH$_3$), 1.9 (4H, m), 3.7 (2H, broad t, CH$_2$CH$_2$O). Mass spectrum CI (CH$_4$) m/e: 269 (MH$^+$), 156, 140.

B. By Addition of a Free Radical to an Olefin in the Presence of a Nitroxide (Scheme 2).

EXAMPLE 7

Preparation of 2-(2-t-Butoxy-1-phenylethoxy)-1,1,3,3-tetraethylisoindoline (7)

A degassed solution of di-t-butylperoxyoxalate (95 mg) and 1,1,3,3-tetraethylisoindolin-2-yloxyl (230 mg) in styrene (5 ml) was heated at 50° C. for 4 hr. The residue obtained after removal of volatiles at reduced pressure was dissolved in warm methanol and cooled in a refrigerator to give colourless needles of the title compound (245 mg), m.p. 85°–86°. $^1$H NMR δ (CDCl$_3$): 0.25 (4H, t, J=7 Hz, CH$_2$CH$_3$), 0.8–1.15 (9H, m, 3×CH$_2$CH$_3$), 1.22 (9H, s, OC(CH$_3$)$_3$), 1.3–2.8 (8H, broad m, 4×CH$_2$CH$_3$), 3.4 (1H, dd, J=10, 4 Hz, OCH$_2$CH), 3.75 (1H, dd, J=10, 4 Hz, OCH$_2$CH), 4.75 (½H, d, J=4 Hz, OCH$_2$CH ), 4.85 (½H, d, J4 Hz, OCH$_2$CH), 6.85–7.5 (9H, m, ArH).

EXAMPLE 8

2-(2-t-Butoxy-1-methyl-1-phenylethoxy)-1,1,3,3-tetraethylisoindoline (8)

1,1,3,3-Tetraethylisoindolin-2-yloxyl (560 mg) and di-t-butylperoxyoxalate (240 mg) in α-methylstyrene (5 ml) gave the title compound (520 mg); m.p. 87.5°–89° (dec) after recrystallization from methanol. $^1$H NMR δ CDCl$_3$): 0.4–1.05 (12H, m, 4×CH$_2$CH$_3$), 1.1 (9H, s, (CH$_3$)$_3$CO), 1.4–2.5 (8H, broad m, 4×CH$_2$CH$_3$), 1.75 (3H, s, CH$_3$CO), 3.4 (1H, d, J=9 Hz, OCH$_2$), 3.6 (1H, d, J=9 Hz, OCH$_2$), 6.8–7.6 (9H, m, ArH). Half life at 60°=75 min.

EXAMPLE 9

2-(2-t-Butoxy-1-cyano-1-methylethoxy)-1,1,3,3-tetraethylisoindoline (9)

The title compound was prepared from 1,1,3,3-tetraethylisoindolin-2-yloxyl (280 mg) and di-t-butylperoxyoxalate (120 mg) in methacrylonitrile (5 ml). It was isolated as an oil (180 mg) by preparative reverse-phase HPLC using a $C_{18}$ column, and 95% acetonitrile/5% water as the eluent. Mass spectrum: MH+ calculated, 388.301. Found, 387.301. $^1$H NMR δ (CDCl$_3$): 0.7 (6H, t, J=7 Hz, 2×CH$_2$CH$_3$), 0.95 (6H, t, J=7 Hz, 2×CH$_2$CH$_3$), 1.25 (9H, s, (CH$_3$)$_3$CO), 1.68 (3H, s, CH$_3$CCN), 2.0 (8H, m, 4×CH$_2$CH$_3$), 3.4 (1H, d, J=9 Hz, OCH$_2$C), 3.75 (1H, d, J=9 Hz, OCH$_2$C), 7.1 (4H, m, ArH). Half life at 60°=55 min.

EXAMPLE 10

2-(2-t-Butoxy-1-methoxycarbonyl-1-methylethoxy)-1,1,3,3-tetraethylisoindoline (10)

The title compound was prepared as in Example 9 but replacing the methacrylonitrile with methyl methacrylate (5 ml). It was isolated as an oil (185 mg) by HPLC using a $C_{18}$ column and 84% ethanol/16% water as the eluent. Mass spectrum: MN+ calculated, 420.311. Found, 420.309. $^1$H NMR δ (CDCl$_3$): 0.7 (6H, t, J=6 Hz, 2×CH$_2$CH$_3$), 0.9 (6H, dt, J=8, 2 Hz, 2×CH$_2$CH$_3$), 1.22 (9H, s, OC(CH$_3$)$_3$), 1.62 (3H, s, CH$_2$CCH$_3$), 1.4-2.4 (8H, m, 4×CH$_2$CH$_3$), 3.45 (1H, d, J=9 Hz, OCH$_2$C), 3.72 (1H, d, J=9 Hz, OCH$_2$C), 3.8 (3H, s, OCH$_3$), 7.2 (5H, m, ArH). Half life at 60°=123 min.

EXAMPLE 11

1-(2-t-Butoxy-1-methyl-1-phenylethoxy)-2,6-dimethyl-2,6-di-n-propylpiperidine (11)

A degassed solution of 2,6-dimethyl-2,6-di-n-propylpiperidin-1-yloxyl (80 mg) and di-t-butylperoxyoxalate (40 mg) in α-methylstyrene (2 ml) was heated at 50° C. for 1.25 hr. Evaporation of the volatiles followed by chromatography of the residue on silica gel gave the title compound (50 mg) as an oil (eluted with light petroleum/benzene 4:1). $^1$H NMR δ (CDCl$_3$): 0.2-1.9 (26H, m), 1.08 (9H, s OC(CH$_3$)$_3$), 1.8 (3H, s, PhCCH$_3$), 3.35 (1H, d, J=9 Hz, OCH$_2$C), 3.68 (1H, d, J=9 Hz, OCH$_2$C), 7.4 (5H, m, ArH). Half life at 60°=10 min.

EXAMPLE 12

1-(2-t-Butoxy-1-phenylethoxy)-2,6-dimethyl-2,6-di-n-propylpiperidine (12)

The title compound was prepared as for Example 11 but replacing α-methylstyrene with styrene (2 ml) and isolated as an oil in the same way. $^1$H NMR δ (CDCl$_3$): 0.2-1.8 (26H, m), 1.0 (9H, s, OC(CH$_3$)$_2$), 3.28 (1H, m, OCH$_2$CH), 3.78 (1H, m, OCH$_2$CH), 7.3 (5H, broad s, ArH). Half life at 80°=400 min.

EXAMPLE 13

N-(2-t-Butoxy-1-methyl-1-phenylethoxy)-N,N-di-t-butylamine (13)

A degassed solution of di-t-butylnitroxide (200 mg) and di-t-butylperoxyoxalate (80 mg) in α-methylstyrene (5 ml) was heated at 45° C. for 1 hr. Evaporation of the volatiles and chromatography of the residue on silica gel with light petroleum/benzene 4:1, gave the title compound as an oil (230 mg). $^1$H NMR δ (CDCl$_3$): 0.95 (9H, s, NC(CH$_3$)$_3$), 1.05 (9H, s, NC(CH$_3$)$_3$), 1.3 (9H, s, OC(CH$_3$)$_3$), 1.75 (3H, s, CH$_2$CCH$_3$), 3.4 (1H, d, J=8 Hz, OCH$_2$), 3.7 (1H, d, J=8 Hz, OCH$_2$), 7.4 (5H, m, ArH). Half life at 40°=18 min.

EXAMPLE 14

N-(2-t-Butoxy-1-cyanoethoxy)-N,N-di-t-butylamine (14)

The title compound was prepared as for Example 13 but replacing α-methylstyrene with acrylonitrile (5 ml). It was isolated as an oil (180 mg) by preparation HPLC using a $C_{18}$ column and 80% acetonitrile/20% water as the eluent. $^1$H NMR δ (CDCl$_3$): 1.19 (9H, s, OC(CH$_3$)$_3$), 1.24 (9H, s, NC(CH$_3$)$_3$), 1.27 (9H, s, NC(CH$_3$)$_3$), 3.6 (2H, d, J=7 Hz, OCH$_2$CH), 4.7 (1H, t, J=7 Hz, OCH$_2$CH). Half life at 90°=105 min.

EXAMPLE 15

N-(2-t-Butoxy-1-phenylethoxy)-N,N-di-t-butylamine (15)

A degassed solution of di-t-butylnitroxide (400 mg) and di-t-butylperoxyoxalate (234 mg) in styrene (5 ml) was heated at 50° C. for 2 hr. The title compound was isolated as an oil (530 mg) (which solidified on keeping) by chromatography on silica gel using light petroleum/benzene 1:1 as the eluent. $^1$H NMR δ (CDCl$_3$): 0.8–1.6 (18H, broad m, 2×NC(CH$_3$)$_3$), 1.08 (9H, s, OC(CH$_3$)$_3$), 3.52 (1H, dd, J=11, 7 Hz, OCH$_2$CH), 3.95 (1H, dd, J=11 5 Hz, OCH$_2$CH), 4.84 (½H, d, J=6 Hz, OCH$_2$CH), 4.9 (½H, d, J=6 Hz, OCH$_2$CH), 7.25 (5H, m, ArH). Half life at 80° C.=70 min; at 90°=22 min.

C. Preparation of Polymer-Derived Alkoxyamines by Hydrogen Abstraction from Polymers in the Presence of a Nitroxide

EXAMPLE 16

Grafting of Di-t-butylnitroxide onto cis-Polybutadiene (Product 16)

A degassed solution of freshly purified cis-polybutadiene (0.5 g, $\overline{M}_n$=400,000), di-t-butylperoxyoxalate (58 mg) and di-t-butylnitroxide (120 mg) in tetrachloroethylene (10 ml) was heated at 50° C. for 2 hr. The reaction mixture was added slowly to acetone (75 ml) with stirring to give the polybutadiene containing grafted nitroxide (0.55 g). The signal in the $^1$H NMR at δ 1.2 confirmed the presence of grafted nitroxide in the ratio of 1 nitroxide per 27 butadiene units. Further precipitation into acetone did not alter the composition of the polymer.

EXAMPLE 17

Grafting of 1,1,3,3-Tetramethylisoindolin-2-yloxyl onto Poly(isobutyl methacrylate) (Product 17)

A degassed solution of poly(isobutyl methacrylate) (0.5 g), 1,1,3,3-tetramethylisoindolin-2-yloxyl (210 mg) and di-t-butylperoxyoxalate (120 mg) in tetrachloroethylene (3 ml) was heated at 50° C. for 3 hrs. The reaction mixture was added slowly to stirred methanol (25 ml) to give the poly(isobutyl methacrylate) containing grafted nitroxide (0.64 g). $^1$H NMR signals at δ 1.3, 1.5 and 6.9–7.3 confirmed the presence of grafted nitroxide in the ratio of 1 nitroxide per 15 isobutyl methacrylate units. Further purification did not alter the composition of the polymer.

D. Preparation of Olefin-Containing Alkoxyamines

EXAMPLE 18

Preparation of
4-Cyano-4-(2,2,6,6-tetramethylpiperidin-1-oxy)pentyl methacrylate (18)

Methacryloyl chloride (174 mg, 1.7 mmol) in diethyl ether (5 ml) was slowly added to a cooled (0° C.) solution of 1-(1-cyano-4-hydroxy-1-methylbutoxy)-2,2,6,6-tetramethylpiperidine (Example 6) (150 mg, 0.56 mmol) in diethyl ether (10 ml) containing triethylamine (339 mg, 3.3 mmole). The reaction was stirred at ambient temperature for 1 hr after which was added triethylamine (2 ml) and water (10 ml) and stirred for a further hour. The layers were separated and the ether layer washed with saturated bicarbonate, water, brine, dried over magnesium sulphate and concentrated. Chromatography using silica gel and dichloromethane as eluent gave the title compound as a colourless oil (132 mg, 70% yield). $^1$H NMR $\delta$ (CDCl$_3$): 1.1 (9H, s), 1.3 (4H, s), 1.5 (5H, broad s), 1.95 (7H, m), 4.2 (2H, m, OC$\underline{H}_2$), 5.5 (1H, m, olefinic C$\underline{H}_2$), 6.1 (1H, broad s, olefinic C$\underline{H}_2$). Mass spectrum CI (CH$_4$) m/e: 337 (MH$^+$), 156, 140.

EXAMPLE 19

Preparation of
4-Cyano-4-(2,2,6,6-tetramethylpiperidin-1-oxy)pentyl acrylate (19)

Acryloyl chloride (540 mg, 5.97 mmol) in diethyl ether (15 ml) was slowly added to a cooled solution of 1-(1-cyano-4-hydroxy-1-methylbutoxy)-2,2,6,6-tetramethylpiperidine (533 mg, 1.98 mmol) (Example 6) in diethyl ether (20 ml) containing triethylamine (1.22 g, 12.4 mmol). After stirring at room temperature for 40 minutes triethylamine (5 ml) and water (5 ml) were added and stirred for 30 min. The ether layer was separated and washed with water, saturated bicarbonate solution, brine, dried over magnesium sulphate and concentrated. Chromatography using silica gel and dichloromethane as eluent gave the product as a colourless oil (416 mg, 65% yield). $^1$H NMR $\delta$ (CDCl$_3$): 1.11 (6H, s), 1.15 (3H, s), 1.51 (6H, m), 1.67 (3H, s, CH—C—C$\underline{H}_3$), 2.02 (4H, m), 4.23 (2H, m, C$\underline{H}_2$—O), 5.68–6.54 (3$\underline{H}$, m, olefinic H). Mass spectrum CI (CH$_4$) m/e: 323 (MH$^+$), 156, 140.

E. Preparation of Oligomeric Alkoxyamines by Copolymerization of Olefinic Alkoxyamines

EXAMPLE 20

Copolymerization of
4-Cyano-4-(2,2,6,6-tetramethylpiperidin-1-oxy)pentyl methacrylate and Styrene (Product 20)

A degassed solution of the title alkoxyamine (500 mg, 1.49 mmol) and styrene (1.6 g, 15.4 mmol) in ethyl acetate (7 ml) containing di-t-butylperoxyoxalate (210 mg, 0.9 mmol) was heated at 35° C. for 2 hr. The product was precipitated from methanol to give 870 mg of a white powder. GPC: $\overline{M}_n=3003$, $\overline{M}_w/\overline{M}_n=1.5$. $^1$H NMR $\delta$ (CDCl$_3$): 0.7–2.3 (aliphatic H), 3.2 (broad s, OC$\underline{H}_2$), 6.3–7.4 (Ar$\underline{H}$).

From the integral values obtained from the $^1$H NMR it was determined that 1 alkoxyamine per 8 styryl units was present in the copolymer. This implied that on the average 4 alkoxyamine moieties were incorporated per chain.

EXAMPLE 21

Copolymerization of
4-Cyano-4-(2,2,6,6-tetramethyl-piperidin-1-oxy)pentyl methacrylate and Methyl Methacrylate A degassed solution of the title alkoxyamine (500 mg, 1.49 mmol) and methyl methacrylate (1.5 g, 15.0 mmol) in ethyl acetate (15 ml) containing di-t-butylperoxyoxalate (200 mg, 0.85 mmol) was heated at 35° C. for 20 hr. The product was precipitated from methanol as a white powder (1.3 g). GPC: $\overline{M}_n=4323$, $\overline{M}_w/\overline{M}_n$ 32 1.6. $^1$H NMR $\delta$ (CDCl$_3$): 0.5–2.0 (aliphatic H) 3.4–3.9 (OC$\underline{H}_3$).

From $^1$H NMR integral data and the GPC determined molecular weight it was deduced that 6 alkoxyamine units were incorporated per chain (ratio of 1 alkoxyamine per 7 methyl methacrylate units).

EXAMPLE 22

Copolymerization of
4-Cyano-4-(2,2,6,6-tetramethylpiperidin-1-oxy)pentyl acrylate and Methyl Acrylate A degassed solution of the title alkoxyamine (100 mg, 0.31 mmol) and methyl acrylate (270 mg, 3.13 mmol) in ethyl acetate (5 ml) containing di-t-butylperoxyoxalate (20.1 mg) was heated at 35° C. for 18 hr. The product was isolated by chromatography using silica gel and light petroleum/ethyl acetate (1:1) as eluent. This gave the product as a gum (132 mg). $^1$H NMR $\delta$ (CDCl$_3$): 1.12–2.3 (aliphatic H), 3.66 (OC$\underline{H}_3$), 4.10 (C$\underline{H}_2$O). GPC: $\overline{M}_n=3756$, $\overline{M}_w/\overline{M}_n=2.4$.

From $^1$H NMR integrals and GPC data it was concluded that approximately 4 alkoxyamine units were incorporated per chain (ratio of 1 alkoxyamine per 10 methyl acrylate moieties).

Preparation of Homopolymers and Random Copolymers

EXAMPLE 23

Preparation of Methyl Acrylate Oligomers of Structure 23

A. (n=1). A degassed solution of 2-(1-cyano-1-methylethoxy)-1,1,3,3-tetraethylisoindoline (62 mg) and 1,1,3,3-tetraethylisoindolin-2-yloxyl (1 mg) in benzene (9 ml) and methyl acrylate (1 ml) was heated at 80° C. for 16 hr. Removal of volatiles gave a colourless gum (90 mg) shown by NMR and HPLC to consist of the title compound n=1 with small amounts of n=2 and 3. The title compound (n=1) was isolated in pure form (65 mg, 82%) by chromatography on silica gel using benzene and benzene/ethyl acetate mixtures as eluent. $^1$H NMR (90 MHz) $\delta$: 0.4–1.1 (12H, m, 4×CH$_2$C$\underline{H}_3$), 1.42 and 1.48 (6H, s, C(CH$_3$)$_2$CN), 1.5–2.4 (8$\underline{H}$, m, C$\underline{H}_2$CH$_3$), 2.08 (2H, d, J=7 Hz, C$\underline{H}_2$CH—O), 2.80 (3H, s, COOC$\underline{H}_3$), 4.60 (1H, t, J=7 Hz, C$\underline{H}_2$C$\underline{H}$—O), 6.9–7.3 (4H, m, Ar$\underline{H}$).

B. (n=7). A degassed solution of 2-(1-cyano-1-methylethoxy)-1,1,3,3-tetraethylisoindoline (62.5 mg) and 1,1,3,3-tetraethylisoindolin-2-yloxyl (0.5 mg) in methyl acrylate (10 ml) was heated at 80° C. for 1.5 hr. A portion of this solution (5 ml) was withdrawn and used in Part C below. Removal of volatiles from the remaining portion (5 ml) gave a colourless gum (95 mg) shown by NMR to have the title structure, where n=7 on average, from measurement of peak intensities. $^1$H NMR (90 MHz) $\delta$: 0.3–1.2 (C$\underline{H}_3$—CH$_2$), 1.35 and 1.40

(CN—C—(CH$_3$)$_2$), 1.2–3.0 (CH$_2$—CH), 3.7 (—OCH$_3$), 4.2–4.6 (NO—CH—COOCH$_3$), 6.8–7.4 (ArH).

C. (n=14). A portion (5 ml) of the reaction mixture from Part B was heated at 100° C. for 4 hr. Removal of volatiles gave a colourless gum (165 mg) shown by NMR to consist of the title oligomer where n=14 on average. The $^1$H NMR of this oligomer differed from that of Part B only in the peak intensities of the end groups.

D. (n=70). A degassed solution of the oligomer from Part B (80 mg) in methyl acrylate (5 ml) was heated at 120° for 1.5 hr. Removal of volatiles gave a colourless gum (0.57 g) which was shown by $^1$H NMR to consist of the title oligomer where n~70 on average. GPC: $\overline{M}_n$=6700, $\overline{M}_w/\overline{M}_n$=1.82.

EXAMPLE 24

Preparation of Methyl Acrylate Oligomers of Structure 24

A. (n=11). A degassed solution of 2-(1-cyano-1-methylethoxy)-1,1,3,3-tetra-n-propylisoindoline and 1,1,3,3-tetra-n-propylisoindolin-2-yloxyl (0.25 mg) in methyl acrylate (5 ml) was heated at 80° C. for 1 hr. A sample (approx. 1 ml) of the reaction mixture was withdrawn and shown to contain the title oligomer (n=11 on average) by $^1$H NMR spectroscopy.

B. (n=16). The remaining reaction mixture from Part A was heated at 100° C. for 2 hr at which time a sample (approx. 1 ml) was withdrawn and shown to contain the title oligomer (n=16 on average) by $^1$H NMR spectroscopy.

C. (n=21). The remaining reaction mixture from Part B was heated at 100° C. for a further 4 hr. Removal of volatiles gave a colourless gum (140 mg) shown by $^1$H NMR to consist of the title oligomer where n=21 on average. $^1$H NMR (90 MHz) δ: 0.7–1.0 (CH$_2$CH$_2$CH$_3$), 1.31 and 1.38 (C(CH$_3$)$_2$CN, singlets), 3.7 (COOCH$_3$), 4.1–4.6 (CH$_2$CH—O), 6.9–7.3 (ArH).

EXAMPLE 25

Preparation of Methyl Acrylate Oligomers of Structure 25

A degassed solution of 1-(1-cyano-1-methylethoxy)-2,2,6,6-tetramethylpiperidine (45 mg) in methyl acrylate (5 ml) was heated at 100° C. for 1 hr to give the title oligomer (n=4 on average). Continued heating at 120° C. for 5 hr increased the chain length to n=8 on average. Further heating at 140° C. for 2 hr increased the chain length to n=22 on average as determined by NMR spectroscopy. A portion of the reaction mixture (3 ml) was added to light petroleum (30 ml) to give colourless product (270 mg). $^1$H NMR (90 MHz) δ: 0.9–1.25 (N—C—CH$_3$), 1.31 and 1.38 (C(CH$_3$)$_2$CN), 3.7 (COOCH$_3$), 4.1–4.4 (CH—O—N).

EXAMPLE 26

Preparation of Methyl Acrylate Oligomer of Structure 26

A degassed solution of N-(2-t-butoxy-1-phenylethoxy)-N,N-di-t-butylamine (52 mg) in methyl acrylate (3 ml) was heated at 100° C. for 0.5 hr. Removal of volatiles gave a colourless gum 0.42 g) shown to have the structure of the title oligomer, in which n=25 on average, by NMR. GPC: $\overline{M}_n$=2500, $\overline{M}_w/\overline{M}_n$=1.7. $^1$H NMR (250 MHz) δ: 1.10 and 1.11 (sharp signals, O-t-butyl), 1.15 and 1.23 (broadened singlets, N-t-butyls), 3.68 (COOCH$_3$), 7.1–7.35 (ArH).

EXAMPLE 27

Preparation of Styrene Oligomers of Strucure 27

A. (n=4.5). A degassed solution of N-(2-t-butoxy-1-phenylethoxy)-N,N-di-t-butylamine (30 mg) and di-t-butylnitroxide (0.5 mg) in styrene (3 ml) was heated at 100° C. for 1 hr. Removal of volatiles gave a colourless gum (73 mg) shown by NMR to consist of the title oligomer where n=4.5 on average.

B. (n=12). The product from Part A and di-t-butylnitroxide (0.5 mg) were dissolved in styrene (5 ml), degassed and heated at 100° C. for a further 1 hr. Removal of volatiles gave the title oligomer (160 mg) in which n=12 on average. $^1$H NMR (90 MHz) δ: 0.7–1.3 (O-t-butyl and N-t-butyls), 3.1–3.4 (CH$_2$—O), 3.9–4.2 (CH—ON), 6.3–7.5 (ArH).

EXAMPLE 28

Preparation of Vinyl Acetate Oligomer of Structure 28

A degassed solution of N-(2-t-butoxy-1-phenylethoxy)-N,N-di-t-butylamine (32 mg) in anhydrous vinyl acetate (3 ml) was heated at 120° C. for 1 hr. Removal of volatiles gave a colourless gum (55 mg) shown by NMR to consist of the title oligomer in which n=2.5 on average. $^1$H NMR (90 MHz) δ: 0.7–1.4 (O-t-butyl and N-t-butyls), 1.7–2.1 (CH$_2$ and CH$_3$COO), 3.2–3.5 (CH$_2$O), 4.6–5.1 (CH—OAc), 6.1–6.3 (O—CH—O), 7.2 (ArH).

EXAMPLE 29

Preparation of Ethyl Acrylate Oligomer of Structure 29

A degassed solution of 2-(1-cyano-1-methylethoxy)-1,1,3,3-tetraethylisoindoline (63 mg) and 1,1,3,3-tetraethylisoindolin-2-yloxyl (0.5 mg) in ethyl acrylate (10 ml) was heated at 80° C. for 2 hr followed by 120° C. for 0.5 hr. Evaporation of volatiles gave the title oligomer (290 mg) (n=11 on average). $^1$H NMR (90 MHz) δ: 0.4–1.1 (C—CH$_2$CH$_3$), 1.1–1.4 (COOCH$_2$CH$_3$ and C—CH$_3$), 1.4–2.5 (CH$_2$—CH), 4.1 (COOCH$_2$CH$_3$) 6.9–7.3 (ArH).

EXAMPLE 30

Co-Oligomerization of Styrene and Methyl Acrylate

A degassed solution of N-(2-t-butoxy-1-phenylethoxy)-N,N-di-t-butylamine (31 mg) and di-t-butylnitroxide (0.5 mg) in styrene (3 ml) and methyl acrylate (3 ml) was heated at 100° C. for 1 hr. The $^1$H NMR (90 MHz) spectrum of the product (140 mg) obtained on evaporation of the volatiles showed it to be a random co-oligomer containing an average of 5.5 styrene units (Ar, δ 6.4–7.4) and 4.3 methyl acrylate units (COOCH$_3$, δ 3.1–3.7) per chain terminated by the di-t-butylaminoxy group (CH$_3$, δ 0.8–1.3). The penultimate groups consisted of both styryl (Ph—CH—OH, δ 3.9–4.2) and acrylate (CH$_3$OOC—CH—ON, δ 4.3–4.7) units.

EXAMPLE 31

Preparation of Methyl Methacrylate Oligomer of Structure 30

A degassed solution of N-(2-t-butoxy-1-methyl-1-phenylethoxy)-N,N-di-t-butylamine (30 mg) in methyl methacrylate (10 ml) and styrene (0.5 ml) was heated at 60° C. for 0.75 hr. Removal of volatiles gave a colourless gum (105 mg) the $^1$H NMR of which is consistent with the structure of the title oligomer (n=10) contaminated with approx. 20% of oligomer possessing an olefinic end group. In this case termination of the propagating poly(methyl methacrylate) radical can take place either by disproportionation with nitroxide to give an olefinic end group (see Examples 33 and 34) or by addition of a unit of styrene followed by coupling with the nitroxide to give the title oligomer. The latter does not propagate further since its alkoxyamine end group does not dissociate into radicals at 60° C. $^1$H NMR (90 MHz) δ: 0.4–1.3 (C—CH$_3$), 1.7–2.2 (backbone CH$_2$), 2.8–3.3 (O—CH$_3$ next to Ph), 3.6 (O—CH$_3$), 4.3–4.8 (PhCHON), 5.45 and 6.2 (C=CH$_2$), 7.3 (ArH).

EXAMPLE 32

Co-Oligomerization of Methyl Methacrylate and Ethyl Acrylate

A degassed solution of N-(2-t-butoxy-1-phenylethoxy)-N,N-di-t-butylamine (64 mg) in ethyl acrylate (4 ml) and methyl methacrylate (1 ml) was heated at 100° C. for 1 hr. Evaporation of volatiles gave a colourless foam (0.55 g). The $^1$H NMR of the random co-oligomer indicated the presence of an average of 15 ethyl acrylate units (COOCH$_2$CH$_3$, δ 3.8–4.3) and 9 methyl methacrylate units (COOCH$_3$, δ 3.6) per chain, assuming 1 phenyl group (δ 7.2) per chain. Proton counts in the methyl region (δ 0.7–1.4) indicated the presence of the di-t-butylaminoxy end group and it should be attached to an ethyl acrylate unit; based on the known behaviour of these systems, GPC: $\overline{M}_n = 2600$, $\overline{M}_w/\overline{M}_n = 1.7$.

Oligomerization of Methyl Methacrylate and Methacrylonitrile: Formation of Macromers When α-methyl substituted monomers, e.g. methyl methacrylate and methacrylonitrile, are polymerized using alkoxyamines as initiators, termination of the growing chains occurs by transfer of a hydrogen atom from the α-methyl substituent to the nitroxide radical giving rise to polymers having olefinic end groups (macromers) and the corresponding hydroxylamine.

EXAMPLE 33

Preparation of Methyl Methacrylate Macromer of Structure 31

A degassed solution of N-(2-t-butoxy-1-methyl-1-phenylethoxy)-N,N-di-t-butylamine (34 mg) in methyl methacrylate (10 ml) was heated at 50° C. for 0.5 hr. Removal of volatiles gave a colourless gum (320 mg) shown by NMR to consist of the title oligomer in which n=27 on average. $^1$H NMR (90 MHz) δ: 3.65 (C—COOCH$_3$), 3.7 (CH$_2$=C—COOCH$_3$) 5.45 and 6.2. (C=CH$_2$), 7.25 (ArH).

EXAMPLE 34

Preparation of Methyl Methacrylate Macromers of Structure 32

A. (n=30). A degassed solution of (1-(1-cyano-1-methylethoxy)-4-oxo-2,2,6,6,-tetramethylpiperidine (50 mg) in methyl methacrylate (4 ml) was heated at 80° C. for 8 hr. Evaporation of volatiles gave the title oligomer as a colourless gum (0.6 g) estimated by NMR to contain approx. 30 monomer units per chain. $^1$H NMR (90 MHz) δ: 1.35 (CN—C—(CH$_3$)$_2$), 3.65 (C—COOCH$_3$), 3.7 (CH$_2$=C—COOCH$_3$), 5.45 and 6.2 (C=CH$_2$). GPC: $\overline{M}_n = 3200$, $\overline{M}_w/\overline{M}_n = 1.15$. The 1-hydroxy-4-oxo-2,2,6,6-tetramethylpiperidine was isolated by extraction of the title oligomer with light petroleum and identified by comparison with an authentic sample.

B. (n=230). A degassed solution of 2-(1-cyano-1-methylethoxy)-1,1,3,3-tetraethylisoindoline (34 mg) and 1,1,3,3-tetraethylisoindolin-2-yloxyl (0.25 mg) in methyl methacrylate (10 ml) was heated at 80° C. for 2 hr. Removal of volatiles gave the title polymer (2.1 g) having $^1$H NMR of poly(methyl methactrylate) with olefinic protons being barely visible at δ 5.45 and 6.2. GPC: $\overline{M}_n = 22700$, $\overline{M}_w/\overline{M}_n = 1.45$.

C. (n=50–60). The above experiment was repeated using a larger amount of nitroxide (5 mg) and increasing the heating time at 80° C. to 15 hr to give 0.6 g of polymer. In this case the olefinic protons of the end group were visible in the $^1$H NMR (δ 5.45 and 6.2) and from these it was estimated that the polymer was 50–60 units in length. Trituration of the polymer with light petroleum gave a near quantitative yield of 2-hydroxy-1,1,3,3-tetraethylisoindoline, measured by HPLC and UV spectroscopy following its oxidation (in air) to the corresponding nitroxide.

EXAMPLE 35

Preparation of Methacrylonitrile Macromer of Structure 33

A degassed solution of 2-(1-cyano-1-methylethoxy)-1,1,3,3-tetraethylisoindoline (32 mg) and 1,1,3,3-tetraethylisoindolin-2-yloxyl (0.5 mg) in methacrylonitrile (10 ml) was heated at 80° for 4 hr. The glassy residue (200 mg) was extracted with benzene from which, after exposure to air overnight, was shown to contain approx. 25 mg of 1,1,3,3-tetraethylisoindolin-2-yloxyl. The $^1$H NMR (90 MHz, d$_6$-acetone) of the polymer showed olefinic protons at δ 6.17 and 6.28 the intensity of which indicated approx. 30 monomer units per chain on average.

BLOCK COPOLYMERS

The following examples provide further evidence for the "living" nature of the alkoxyamine-initiated polymerizations.

EXAMPLE 36

Preparation of Methyl Acrylate/Ethyl Acrylate AB Block Cooligomers of Structure (34)

A degassed solution of the methyl acrylate oligomer prepared in Example 26 (160 mg) in ethyl acrylate (3 ml) was heated at 100° C. for 0.5 hr. $^1$H NMR analysis of the colourless gum (285 mg), obtained on evaporation of volatiles, showed that 19 ethyl acrylate units, per chain on average, had added on to the starting oligo(-methyl acrylate). $^1$H NMR (250 MHz) δ: 1.10 and 1.11 (sharp signals, O-t-butyl), 1.15 (one N-t-butyl, the other is obscured), 1.2–1.3 (O—CH$_2$CH$_3$), 3.68 (COOCH$_3$), 4.0–4.2 (O—CH$_2$CH$_3$), 7.1–7.35 (ArH). GPC: $\overline{M}_n = 4300$ ($\overline{M}_w/\overline{M}_n = 1.7$) confirmed the expected increase in molecular weight.

EXAMPLE 37

Preparation of Methyl Acrylate/Styrene Diblock of Structure 35

A degassed solution of the oligomer prepared in Example 26 (100 mg) in styrene (3 ml) was heated at 100° C. for 3 hr. At the start of the reaction and after each hour of heating di-t-butylnitroxide (0.5 mg) was added in order to suppress the thermal initiation of styrene.

Removal of volatiles gave the title AB block co-oligomer. HPLC fractionation, together with $^1$H NMR analysis, proved that the styrene units were attached to the starting methyl acrylate oligomer. $^1$H NMR (90 MHz) δ: 0.7-1.3 (C—CH$_3$), 1.3-2.6 (CH$_2$—CH), 3.3-3.55 (COOCH$_3$ next to Ar), 3.65 (COOCH$_3$), 6.3-7.4 (ArH).

EXAMPLE 38

Preparation of Ethyl Acrylate/Methyl Acrylate Diblock of Structure 36

A degassed solution of the ethyl acrylate oligomer of Example 29 (200 mg) in methyl acrylate (10 ml) was heated at 120° C. for 1 hr. The colourless gum (460 mg), obtained on removal of volatiles, was shown by NMR to consist of the EA-MA diblock of sturcture 36. $^1$H NMR (90 MHz) δ: 0.4-1.1 (C—CH$_2$—CH$_3$), 1.1-1.4 (COOCH$_2$CH$_3$ and C—CH$_3$) 1.4-2.5 (CH$_2$—CH), 3.65 (COOCH$_3$), 4.1 (COOC$\underline{H}_2$CH$_3$), 6.9-7.3 (ArH).

EXAMPLE 39

Preparation of Methylacrylate/Ethylacrylate/Methyl Methacrylate ABC Triblock Copolymer of Structure 37

A degassed solution of the MA-EA diblock of Example 36 (80 mg) and di-t-butylnitroxide (0.025 mg) in methyl methacrylate (2 ml) was heated at 100° C. for 0.5 hr. The $^1$H NMR of the product (220 mg), obtained on evaporation of volatiles, indicated that approx. 60 methyl methacrylate units per chain on average, had added onto the MA-EA diblock to give the triblock of structure 37. $^1$H NMR (250 MHz) δ: 1.10 and 1.11 (O-t-butyl), 3.60 (COOCH$_3$ of MMA), 3.68 (COOCH$_3$ of MA), 4.0-4.2 (O—CH$_2$CH$_3$), 7.1-7.35 (ArH). The N-t-butyl signals of the starting material were no longer present. GPC: $\overline{M}_n$=10500 ($\overline{M}_w/\overline{M}_n$=2.6) confirmed the expected increase in chain length.

Preparation of Graft Copolymers

EXAMPLE 40

Preparation of Poly(Butadiene-g-Methyl Acrylate) of Structure 38

A degassed solution of polybutadiene containing grafted di-t-butylnitroxide (0.1 g) (Example 16) in tetrachloroethylene (5 ml) and methylacrylate (2 ml) was heated at 95° C. for 15 hr. The reaction mixture was added slowly to stirred acetone (20 ml) to give the title graft copolymer. $^1$H NMR signals at δ 3.65 (—OCH$_3$) and 1.0-2.4 (CH$_2$—CH) confirmed the presence of methyl acrylate grafted onto polybutadiene [δ 2.1 (CH$_2$—CH$_2$), 5.4 (CH=CH)] in the ratio of 1 methyl acrylate unit to 6 butadiene units. The $^1$H NMR signal at δ 1.2 established that the di-t-butylaminoxy function remained attached to the methyl acrylate chains.

EXAMPLE 41

Preparation of Poly(Isobutyl Methacrylate-g-Ethyl Acrylate) of Structure 39

A degassed solution of poly(isobutyl methacrylate) containing grafted 1,1,3,3-tetramethylisoindolin-2-yloxyl (0.2 g) (Example 17) in ethyl acrylate (5 ml) was heated at 150° C. for 2 hr. The polymer was precipitated by addition of the reaction mixture to methanol. $^1$H NMR showed the ratio of isobutyl methacrylate (δ 3.7) to ethyl acrylate (δ 4.1) to be 1.3:1 while the signal from the isoindolinoxy function appeared at δ 6.9-7.3.

EXAMPLE 42

A. Prep. of Poly(Styrene-g-Methyl Acrylate) of Structure 40

A degassed solution of the copolymer from Example 20 (120 mg) in methyl acrylate (12 ml) was heated at 100° C. for 2 hr. The product was isolated by precipitation from methanol which gave a white powder (98 mg). $^1$H NMR δ (CDCl$_3$): 0.7-1.6 (aliphatic H), 3.2 (OCH$_2$), 3.7 (OCH$_3$, from grafted methyl acrylate), 6.3-7.3 (ArH). From the $^1$H NMR it was deduced that 3 methyl acrylate units per alkoxyamine were grafted onto the copolymer.

B. Extending the Methyl Acrylate Grafts

The grafted polymer from Part A (32 mg) was dissolved in methyl acrylate (3 ml), degassed and heated at 120° C. for 2 hrs. The product was 42 mg of a white powder. H.P.L.C. (reverse phase) analysis of the product using acetonitrile: tetrahydrofuran as solvent (gradient: 90% CH$_3$CN for 5 min, 90%-50% CH$_3$CN/15 min) showed that no methyl acrylate homopolymer was present. $^1$H NMR δ (CDCl$_3$): 0.7-1.6 (aliphatic H), 3.7 (OCH$_3$, from grafted methyl acrylate), 6.3-7.3 (ArH). From the integrals of the $^1$H NMR spectrum it was calculated that there are approximately 18 methyl acrylate units present per alkoxyamine.

EXAMPLE 43

Preparation of Poly(Styrene-g-Methyl Methacrylate) of Structure 41

A degassed solution of the copolymer from Example 20 (96 mg) in methyl methacrylate (2.1 g, 21.1 mmol) was heated at 100° C. for 1 hr. The monomer was removed under vacuum to yield a glassy solid (160 mg). $^1$H NMR δ (CDCl$_3$): 0.9-1.9 (aliphatic H), 3.2 (CH$_2$O), 3.4-3.7 (CH$_3$O, from grafted methyl methacrylate), 6.62-7.1 (ArH). From the $^1$H NMR integrals it was calculated that 6-7 methyl methacrylate units were grafted for each alkoxyamine.

EXAMPLE 44

Preparation of Poly(Methyl Methacrylate-g-Styrene) of Structure 42

A degassed solution of the copolymer from Example 21 (100 mg) in styrene (2 ml) was heated at 100° C. for 4 hr. The product was isolated by chromatography using silica gel and light petroleum:ethyl acetate (1:1) as eluent. This gave the product free from any homopolymer as a white powder (180 mg). $^1$H NMR δ (CDCl$_3$): 0.9-2.0 (aliphatic H), 3.6 (OCH$_3$, from backbone methyl methacrylate), 6.3-7.3 (ArH, from grafted styrene). From the integrals of $^1$H NMR it was calculated that 12 styrene units had been incorporated per alkoxyamine.

EXAMPLE 45

Preparation of Poly(Methyl Methacrylate-g-Methyl Methacrylate) of Structure 43

A degassed solution of the poly(methyl methacrylate-coalkoxyamine) from Example 21 (100 mg) in methyl methacrylate (2 ml) was heated at 100° C. for 0.5 hr. The excess monomer was removed under vacuum to yield (284 mg) of a white powder. $^1$H NMR δ (CDCl$_3$): 0.7-2.1 (aliphatic H), 3.6 (OCH$_3$).

The amount of grafted methyl methacrylate was calculated from the weight of product obtained as the $^1$H NMR was not useful for this purpose. This method suggested that 12 methyl methacrylate units were grafted onto the backbone per alkoxyamine unit.

EXAMPLE 46

Preparation of Poly(Methyl Methacrylate-g-Methyl Acrylate) of Structure 44

A degassed solution of the poly(methyl methacrylate-coalkoxyamine) from Example 21 in methyl acrylate (2 ml) was heated at 100° C. for 2 hr. The monomer was removed under vacuum to yield (142 mg) of a white powder. The amount of grafted methyl acrylate was calculated as for example 10 and it was found that 3 methyl acrylate units had been incorporated for each alkoxyamine.

$^1$H NMR $\delta$ (CDCl$_3$): 0.6–2.2 (aliphatic H), 3.6 (OCH$_3$, from methyl methacrylate), 3.7 (OCH$_3$ from methyl acrylate). EXAMPLE 47

Preparation of Poly(Methyl Acrylate-g-Styrene) of Structure 45

A degassed solution of the poly(methyl acrylate-coalkoxyamine) from Example 22 (87.5 mg) in styrene (2.3 g) was heated at 100° C. for 2 hr. The product was precipitated from methanol and chromatographed on silica gel using benzene to remove the styrene homopolymer and then ethyl acetate to collect the product (50 mg). $^1$H NMR $\delta$ (CDCl$_3$): 0.9–2.3 (aliphatic H) 3.6 (OCH$_3$ from methyl acrylate backbone), 6.5–7.0 (ArH from grafted styrene). From the integrals of the $^1$H NMR it was calculated that 2–3 styrene units were grafted for each alkoxyamine.

Reactions of the Aminoxy End Groups

EXAMPLE 48

Conversion of Aminoxy End Group to Hydroxy End Group by Zinc-Acetic Acid Reduction (Scheme 3)

The aminoxy-terminated methyl acrylate oligomer of Example 23 Part B (100 mg) and zinc dust (0.2 g) in acetic acid (5 ml) was heated at reflux for 2 hr with 3 further additions of zinc dust (0.1 g each) during the course of the reaction. The residue obtained after filtration and removal of volatiles was dissolved in ethyl acetate and extracted with dilute hydrochloric acid. A near-quantitative yield of 1,1,3,3-tetraethylisoindoline was recovered from the acidic layer by basification and extraction. Evaporation of the ethyl acetate solution gave the hydroxyl-terminated oligomer (Scheme 3) in which the $^1$H NMR signal of NO—CH—COOCH$_3$ at $\delta$ 4.2–4.6 was replaced by a signal at $\delta$ 4.7–6.1, attributed to the HO—CH—COOCH$_3$ group.

EXAMPLE 49

Replacement of Aminoxy End Group by H: Reduction with a Thiol (Scheme 4)

A degassed solution of N-(2-t-butoxy-1-phenylethoxy)-N,N-di-t-butylamine (Example 15) (66 mg) in ethanethiol (1 ml) was heated at 80° C. for 16 hr. $^1$H NMR analysis of the residue obtained on removal of excess thiol showed the presence of 1-t-butoxy-2-phenylethane, N,N-di-t-butylhydroxylamine and diethyl disulphide. 1-t-Butoxy-2-phenylethane was isolated in 80% yield by chromatography on silica gel. $^1$H NMR (90 MHz), $\delta$ (CCl$_4$): 1.18 (9H, s, O-t-butyl), 2.8 (2H, t, CH$_2$Ar), 3.5 (2H, t, CH$_2$O), 7.2 (5H, s, ArH).

EXAMPLE 50

Preparation of H-Terminated Methyl Acrylate Oligomer of Structure 46

A degassed solution of aminoxy-terminated methyl acrylate oligomer of Example 23 Part C (100 mg) in benzene (5 ml) and ethanethiol (1 ml) was heated at 100° C. for 16 hrs. The reaction mixture was concentrated and diluted with light petroleum to give a gum the $^1$H NMR of which showed the absence of the signal at $\delta$ 4.2–4.6 (NO—CH—COOCH$_3$) as well as those of the isoindoline moiety ($\delta$ 0.3–1.2 and 6.8–7.4). By analogy with Example 49, the product was considered to have structure 46.

We claim:

1. A method for the production of a polymer or a copolymer, including an oligomer, by free radical polymerization of one or more unsaturated monomers comprising heating with the monomer a compound according to the general formula (I)

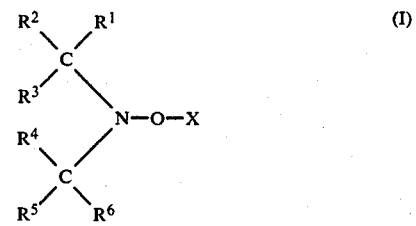

wherein
X represents a group having at least one carbon atom and is such that the free radical X· derived from X is capable of initiating polymerization of the unsaturated monomer by free radical polymerisation and the radical functionality resides in a carbon atom,
R$^1$, R$^2$, R$^5$ and R$^6$ represent the same or different straight chain or branched substituted or unsubstituted alkyl groups of a chain length sufficient to provide steric hindrance and weakening of the O—X bond of the compound of formula I, and
R$^3$ and R$^4$ represent the same or different straight chain or branched substituted alkyl groups or R$^3$CNCR$^4$ may be part of a cyclic structure which may have fused with it another saturated or aromatic ring, the cyclic structure or aromatic ring being optionally substituted.

2. A method according to claim 1 comprising a two stage method for preparing a graft polymer comprising a first stage of forming a polymer backbone with pendant alkoxyamine groups of the general structure of formula I and a second stage of adding a second monomer and heating to form a graft copolymer by controlled growth free radical polymerization initiated by a radical derived from X.

3. A method according to claim 2 comprising a third stage of adding a third monomer and heating to form a block copolymer with the grafted chains of the graft polymer by controlled growth free radical polymerization initiated by a radical derived from X.

4. A method according to claim 1 for making a polymer containing an alkoxyamine group comprising copolymerizing two or more monomers wherein at least one of the monomers contains the alkoxyamine group of the general structure of formula I.

5. A method according to claim 2 in which the second step comprises polymerizing a mixture of two or more monomers to provide a graft copolymer in which the grafted chains are random copolymers.

6. A method according to claim 1 for producing a copolymer from a mixture of two or more monomers in which the copolymer is a random copolymer.

7. A method according to claim 2 in which the polymer of the first stage is a homopolymer, block polymer or random polymer and the graft polymer of the second stage is a homopolymer block polymer or random polymer.

8. A method according to claim 1 in which the polymerization is conducted in a non-polymerizable medium.

9. A method according to claim 8 in which the non-polymerizable medium is selected from the group consisting of benzene, toluene and ethyl acetate.

10. A method according to claim 1 comprising sequentially adding a second unsaturated monomer and heating so as to form a block or graft copolymer in conjunction with the polymer of the first monomer.

11. A method according to claim 1 for producing polymers comprising forming a polymer having functional terminal groups which are located at one end of the chains and initiator residues located on the other end of the chains.

12. A method according to claim 11 further comprising the steps of removing the initiator residues from the chains and allowing the thus removed residues to recombine with a further radical to form a compound of formula I as defined in claim 1.

13. A method according to claim 11 further comprising adding an additional functional group at the location of removal of the initiator residue.

14. A method according to claim 11 comprising reacting the polymer with zinc in acetic acid.

15. A method according to claim 2 in which the first stage comprises reacting a polymer with a non-carbon centre free radical in the presence of a nitroxide of formula I as defined in claim 1.

16. A compound suitable for use in a process for the production of a polymer, particularly an oligomer, by free radical polymerization of a suitable unsaturated monomer, said compound having the structure of general formula (I)

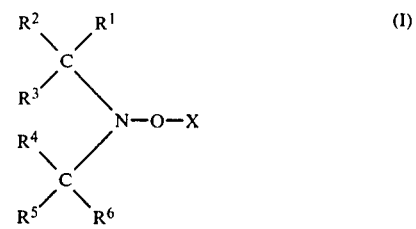

wherein
X represents a group having at least one carbon atom and is such that the free radical X· is capable of polymerising the unsaturated monomer by free radical polymerisation, and the radical functionality resides on the or one of the carbon atoms, $R^1$, $R^2$, $R^5$ and $R^6$ represent the same or different straight chain or branched substituted or unsubstituted alkyl groups of a chain length sufficient to provide steric hindrance and weakening of the O—X bond, and $R^3$ and $R^4$ represent the same or different straight chain or branched substituted alkyl groups or $R^3CNCR^4$ is part of a cyclic structure which may have fused with it another saturated or aromatic ring, the cyclic structure or aromatic ring being optionally substituted.

17. A compound according to claim 16 in which the cyclic structure is a 5- or 6-membered ring system.

18. A compound according to claim 16 in which the cyclic structure is

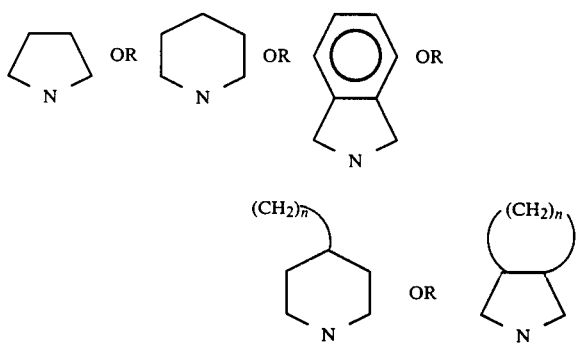

wherein n is an integer from 1 to 10 including such cyclic groups when substituted 19. A compound according to claim 18, wherein n is an integer from 1 to 6.

* * * * *

UNITED STATES PATENT AND TRADEMARK OFFICE
CERTIFICATE OF CORRECTION

PATENT NO. : 4,581,429
DATED : April 8, 1986
INVENTOR(S) : David Henry SOLOMON et al It is certified that error appears in the above-identified patent and that said Letters Patent is hereby corrected as shown below:

IN THE CLAIMS:

Claim 18, line 4, (column 24, line 45), delete first formula and insert:

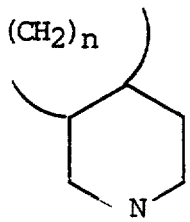

Signed and Sealed this

Nineteenth Day of July, 1988

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,581,429

DATED : April 8, 1986

INVENTOR(S) : David Henry SOLOMON et al

It is certified that error appears in the above-identified patent and that said Letters Patent is hereby corrected as shown below:

IN THE CLAIMS:

Claim 16, lines 13-19, (column 24, lines 23 and 24) delete in their entirety.

Signed and Sealed this

Twentieth Day of September, 1988

Attest:

DONALD J. QUIGG

Attesting Officer

Commissioner of Patents and Trademarks